Figure 1:
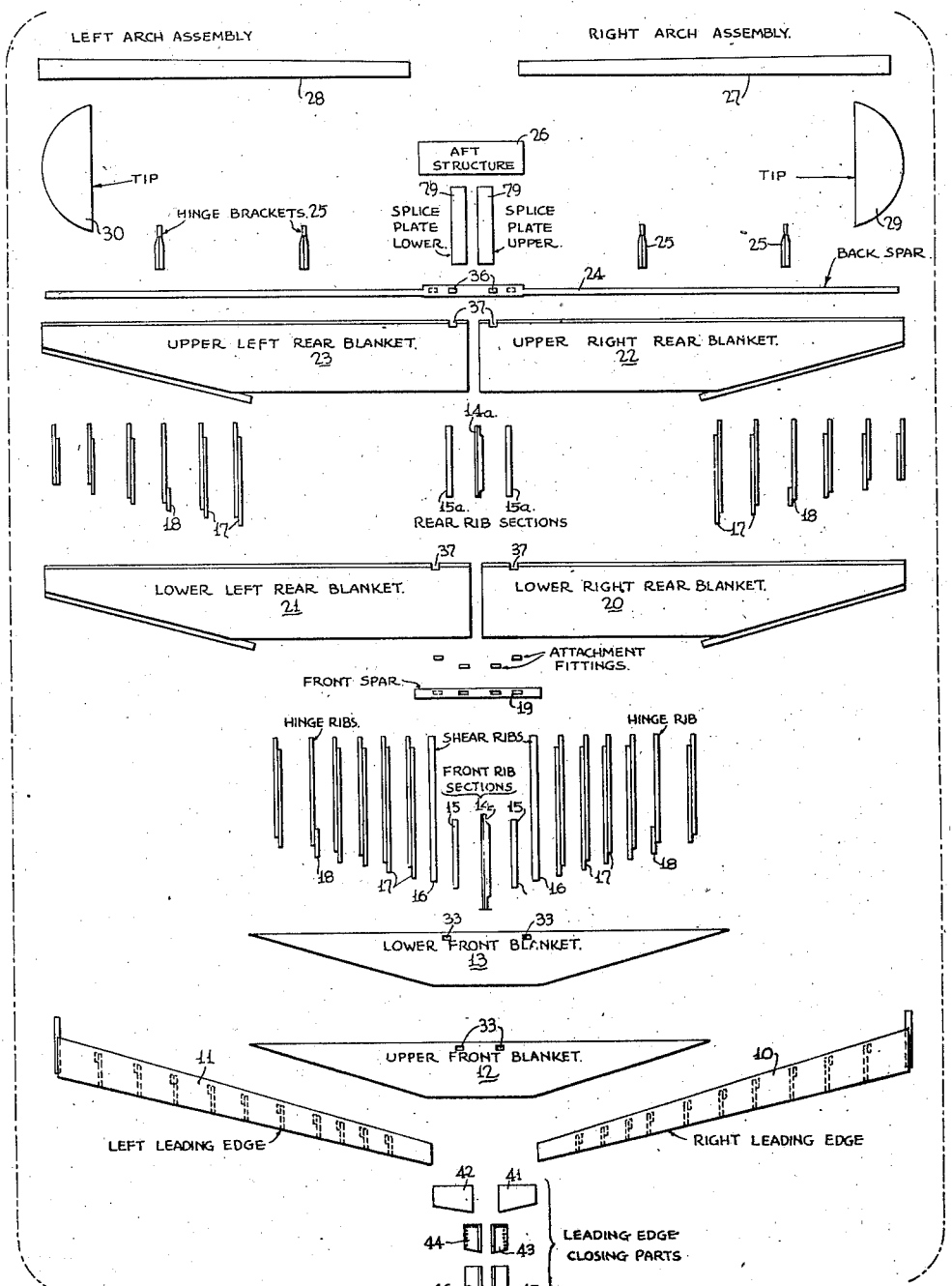

Nov. 4, 1947.  M. WATTER ET AL  2,430,438

METHOD OF MANUFACTURING AND ASSEMBLING AIRFOIL STRUCTURES

Filed March 15, 1943    19 Sheets-Sheet 1

INVENTORS.
Michael Watter
Frank P. Bender.
BY
John P. Barby
ATTORNEY

Nov. 4, 1947.    M. WATTER ET AL    2,430,438
METHOD OF MANUFACTURING AND ASSEMBLING AIRFOIL STRUCTURES
Filed March 15, 1943    19 Sheets-Sheet 2
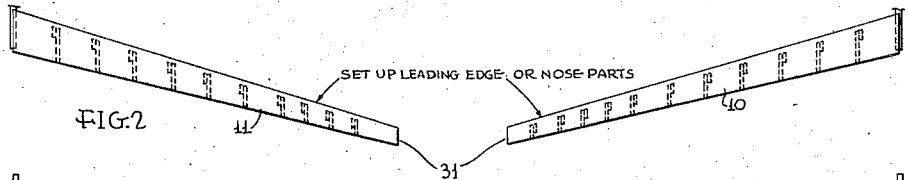
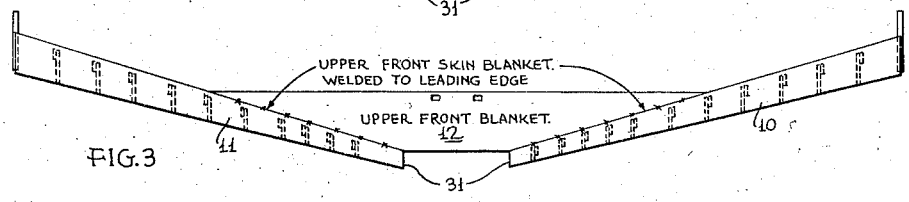
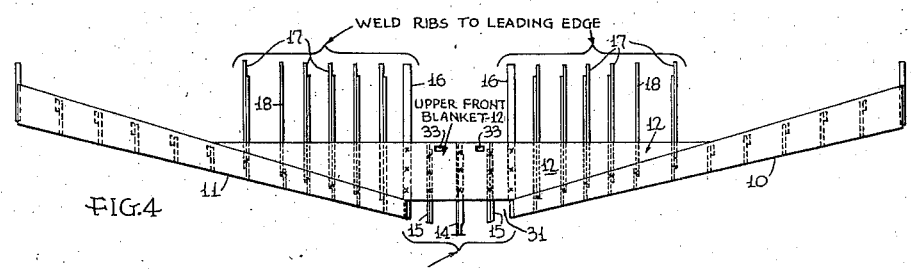
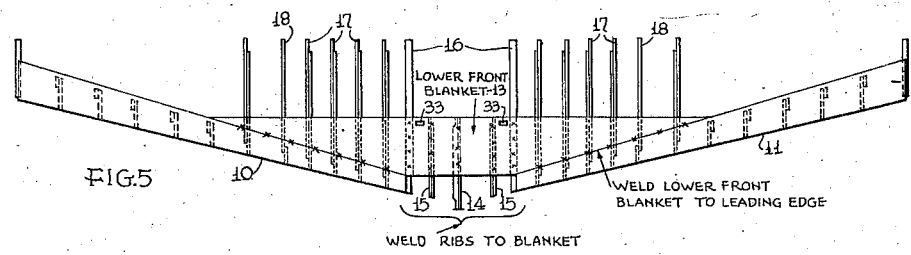
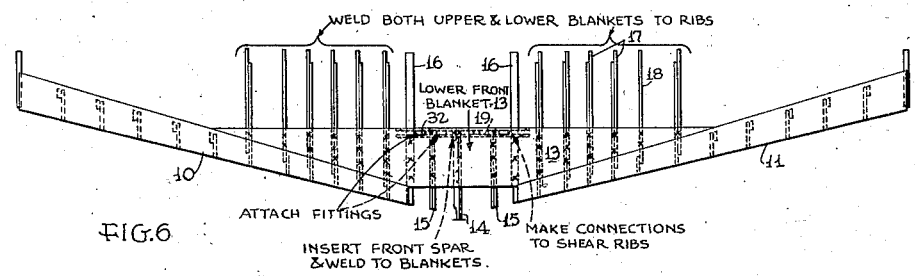
INVENTORS.
Michael Watter
Frank P. Bender.
BY
ATTORNEY Nov. 4, 1947. M. WATTER ET AL 2,430,438
METHOD OF MANUFACTURING AND ASSEMBLING AIRFOIL STRUCTURES
Filed March 15, 1943 19 Sheets-Sheet 3
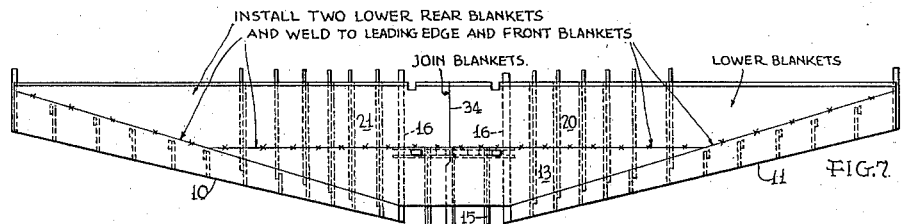
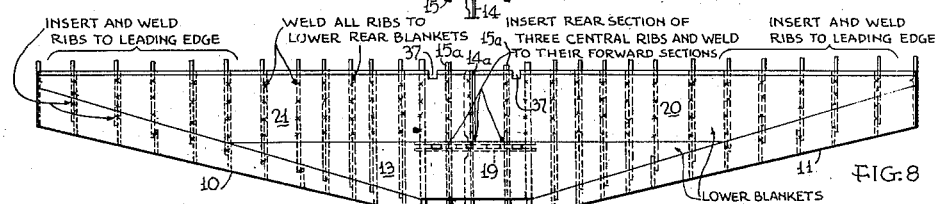
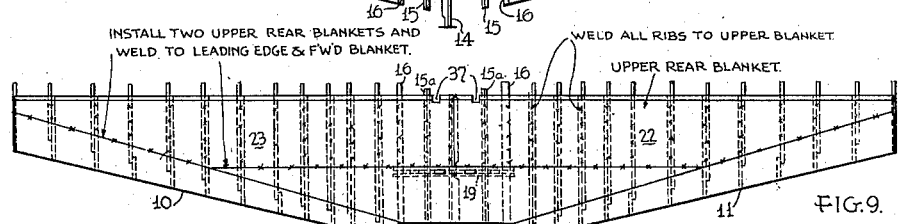
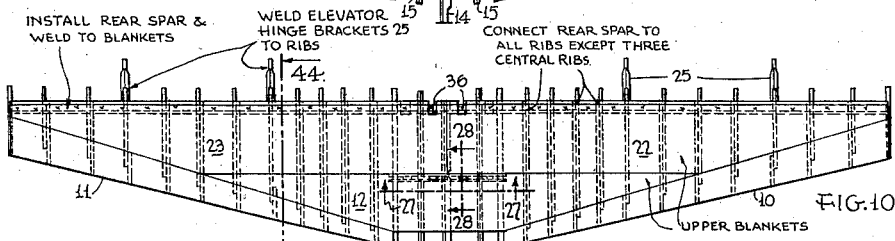
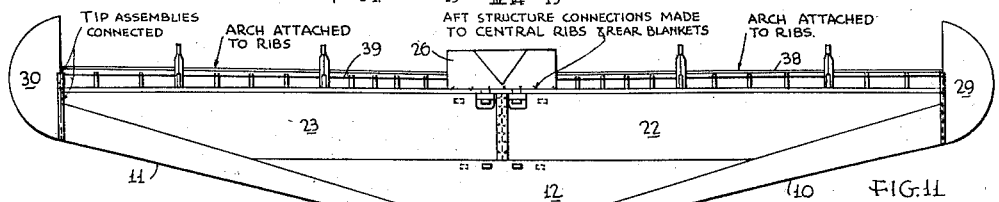
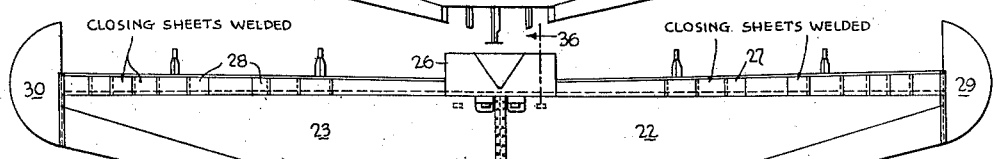
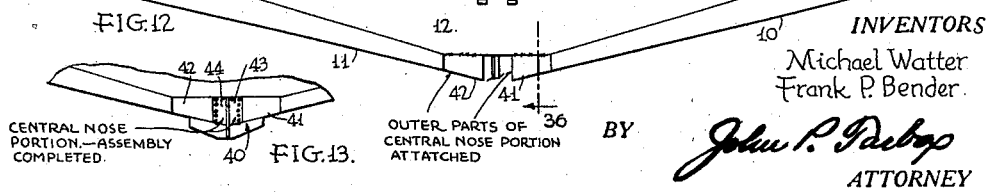
INVENTORS
Michael Watter
Frank P. Bender.
BY
ATTORNEY

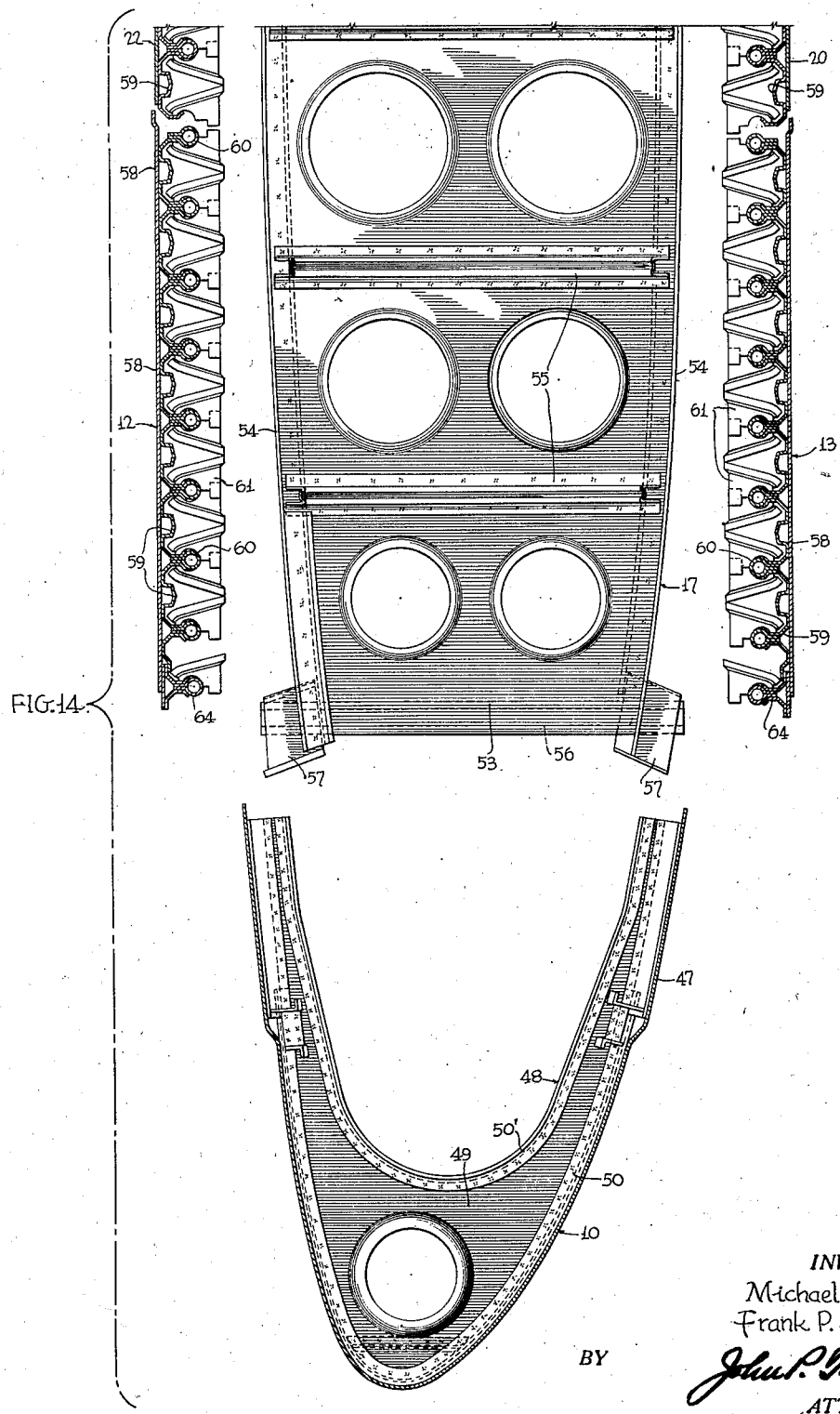

Nov. 4, 1947.  M. WATTER ET AL  2,430,438
METHOD OF MANUFACTURING AND ASSEMBLING AIRFOIL STRUCTURES
Filed March 15, 1943  19 Sheets-Sheet 5

INVENTORS
Michael Watter
Frank P. Bender
BY
ATTORNEY

INVENTORS
Michael Watter
Frank P. Bender
BY
ATTORNEY

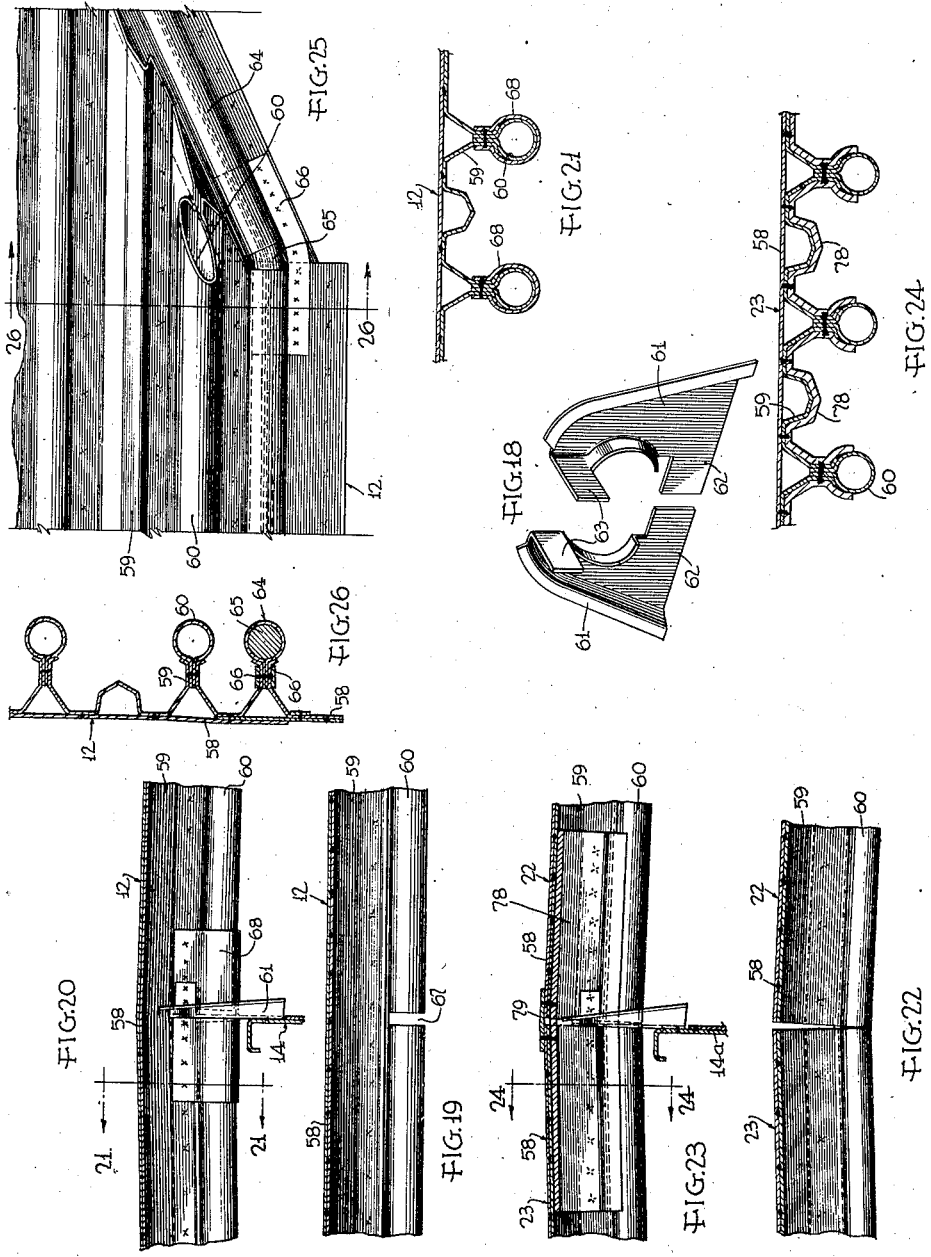

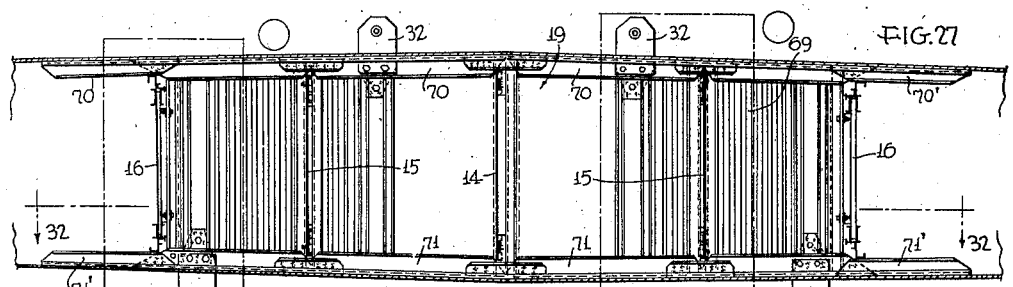
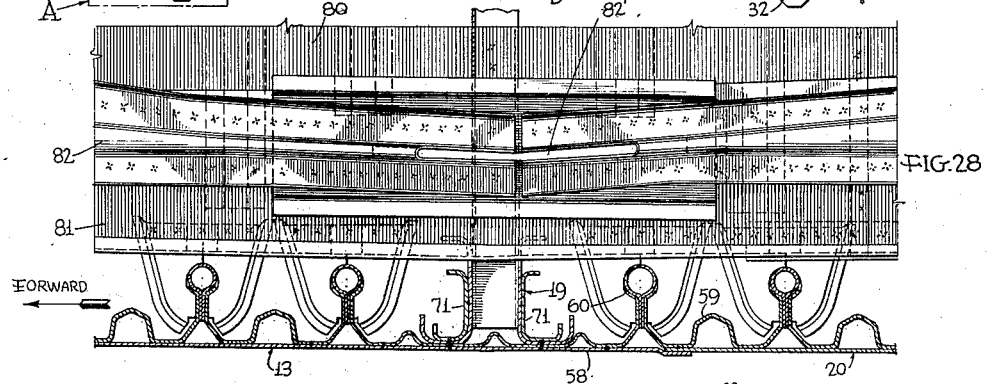
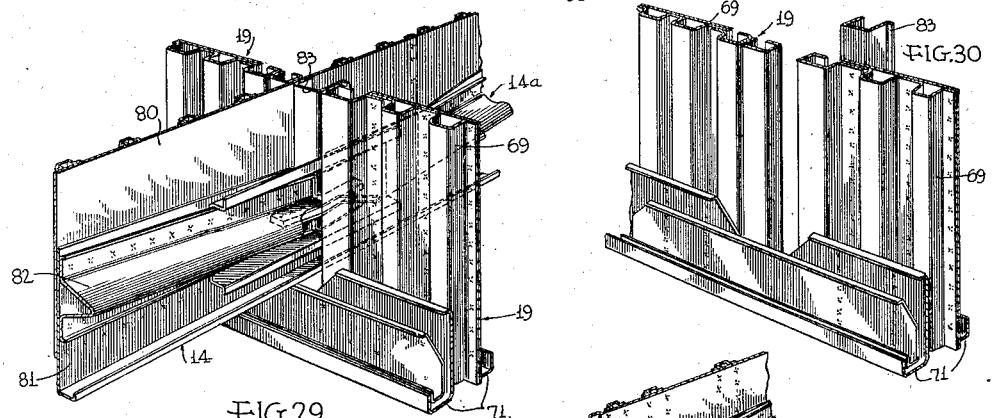
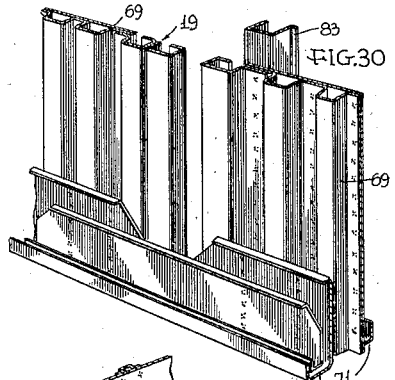
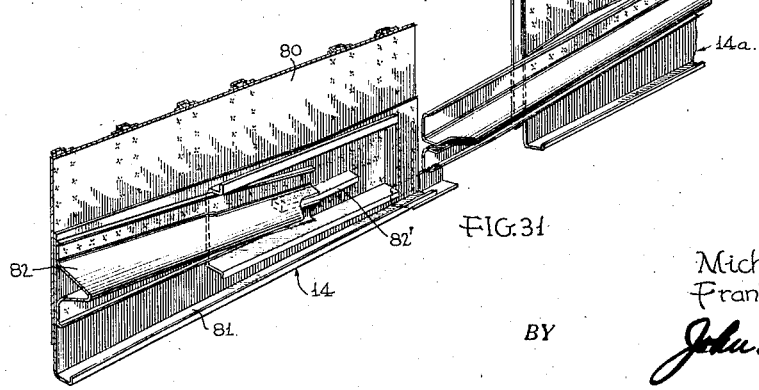
INVENTORS
Michael Watter
Frank P. Bender.
ATTORNEY Nov. 4, 1947. M. WATTER ET AL 2,430,438
METHOD OF MANUFACTURING AND ASSEMBLING AIRFOIL STRUCTURES
Filed March 15, 1943 19 Sheets-Sheet 9
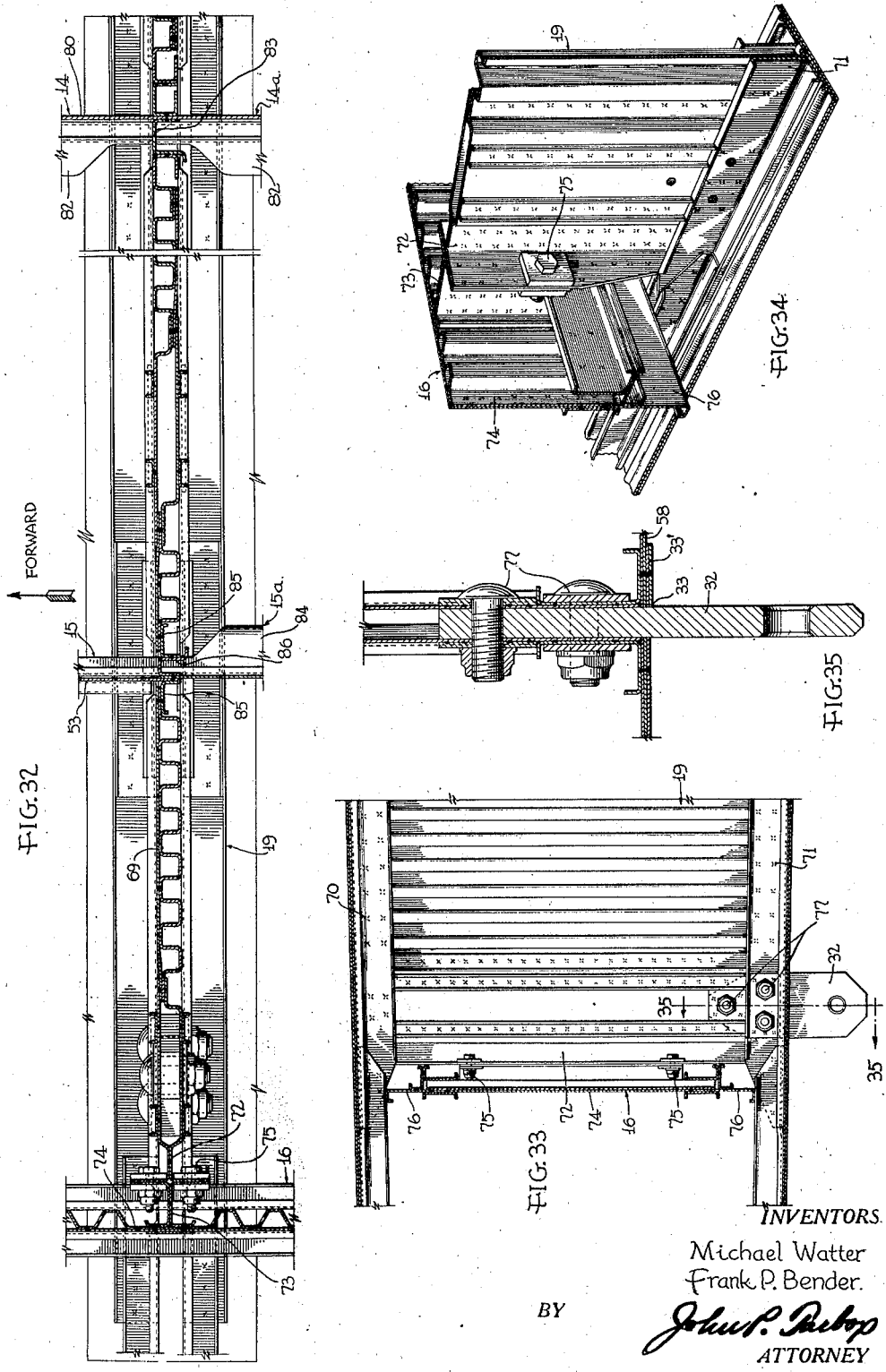
INVENTORS
Michael Watter
Frank P. Bender.
BY
ATTORNEY Nov. 4, 1947.  M. WATTER ET AL  2,430,438
METHOD OF MANUFACTURING AND ASSEMBLING AIRFOIL STRUCTURES
Filed March 15, 1943   19 Sheets-Sheet 10
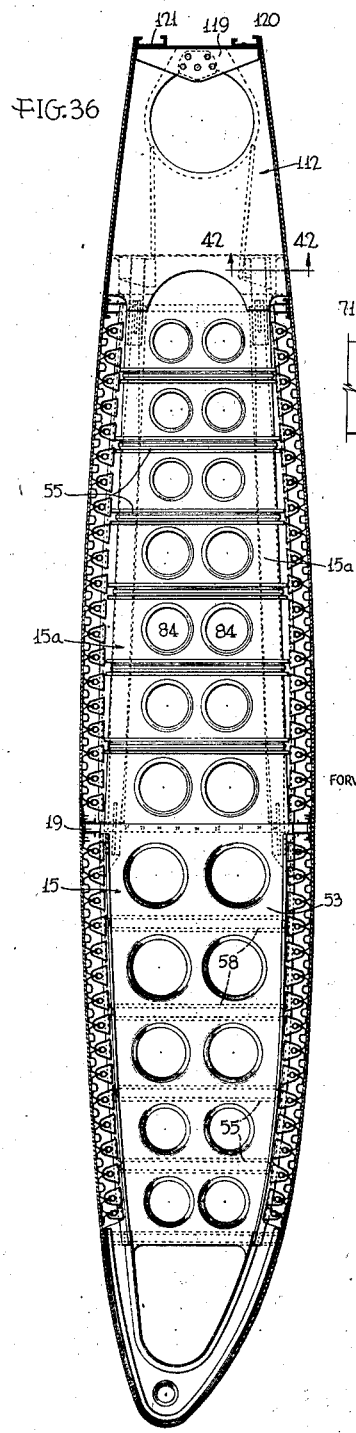
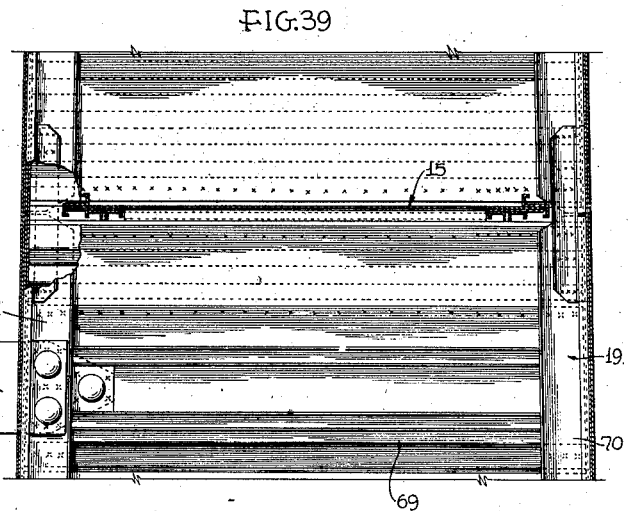
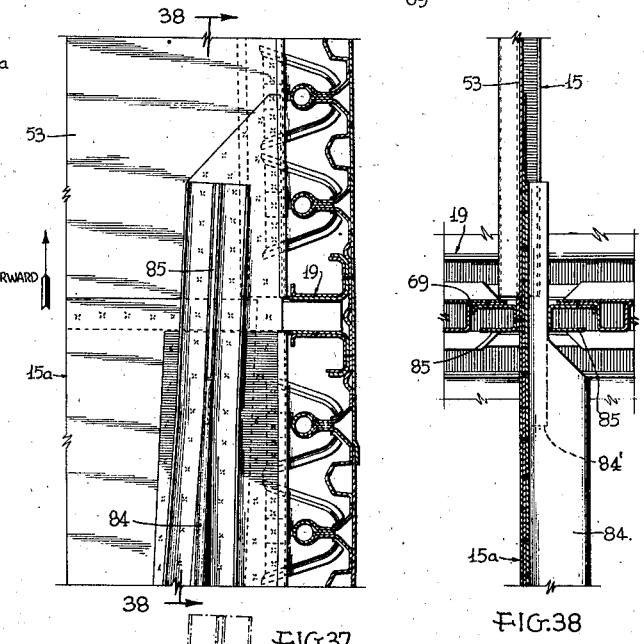
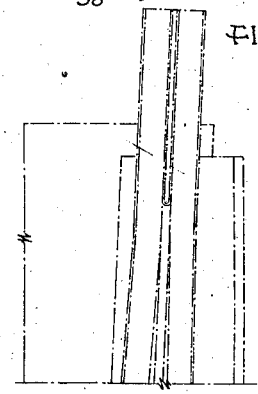
INVENTORS
Michael Watter
Frank P. Bender
BY *John P. Barbop*
ATTORNEY Nov. 4, 1947.    M. WATTER ET AL    2,430,438
METHOD OF MANUFACTURING AND ASSEMBLING AIRFOIL STRUCTURES
Filed March 15, 1943    19 Sheets-Sheet 11
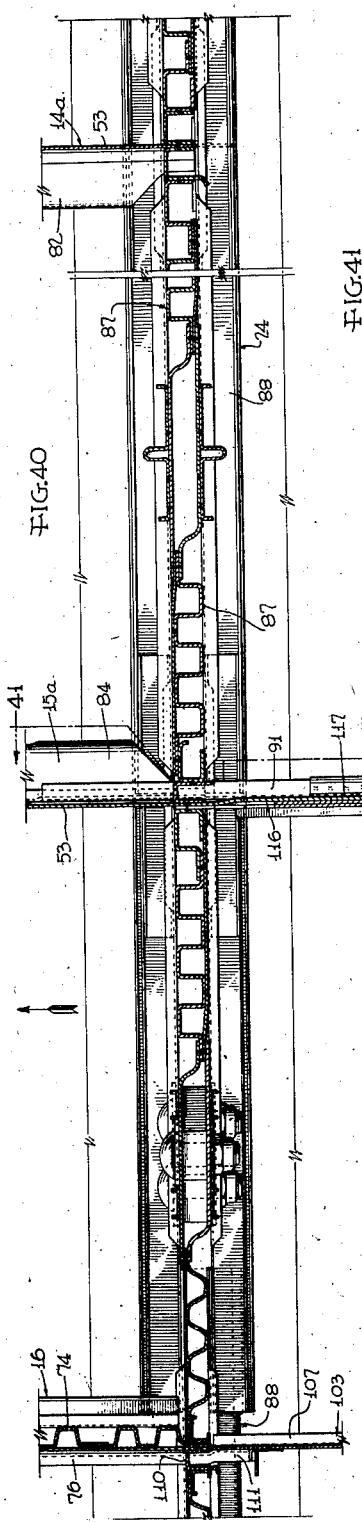
INVENTORS.
Michael Watter
Frank P. Bender
BY
*John P. Bishop*
ATTORNEY

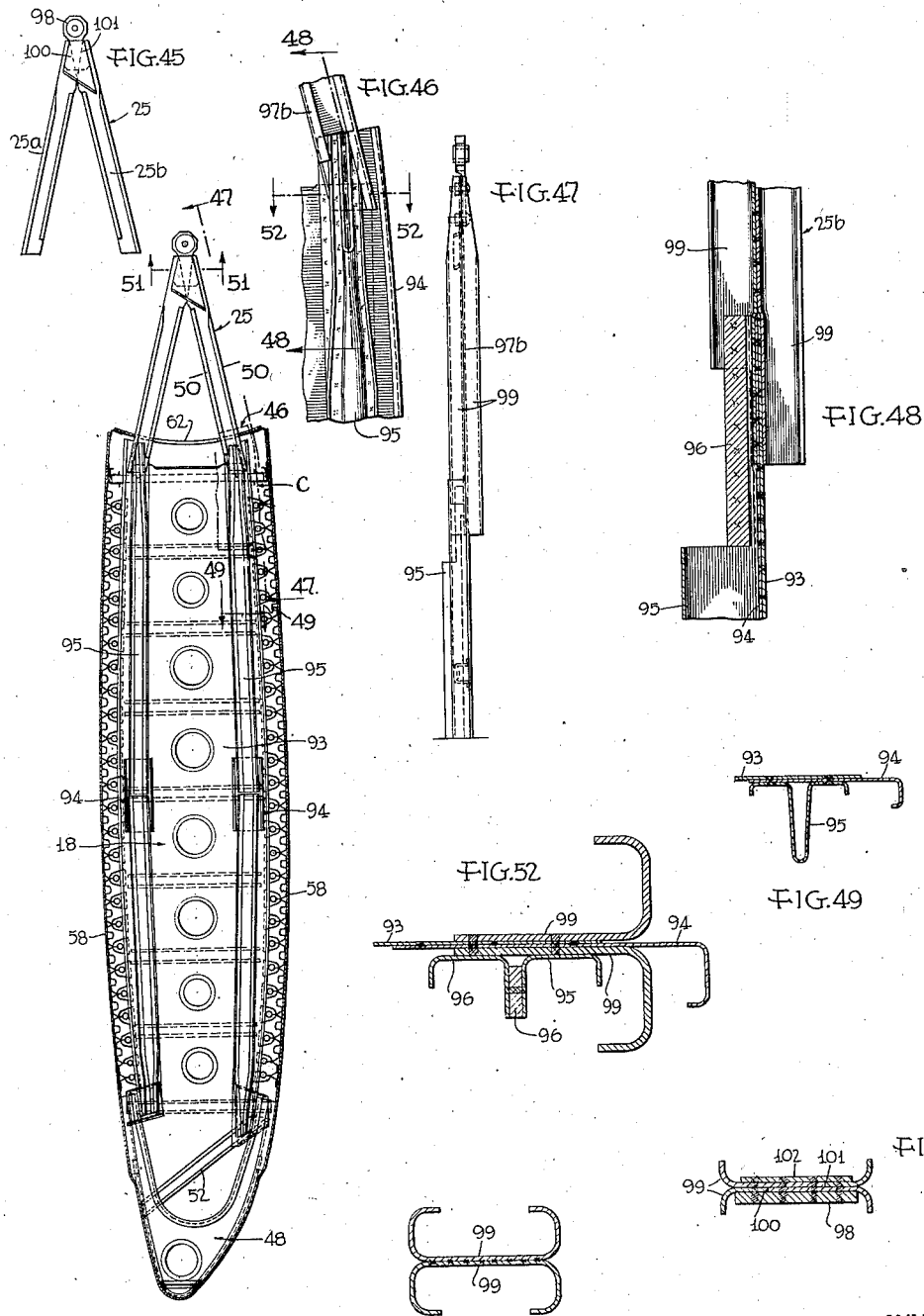

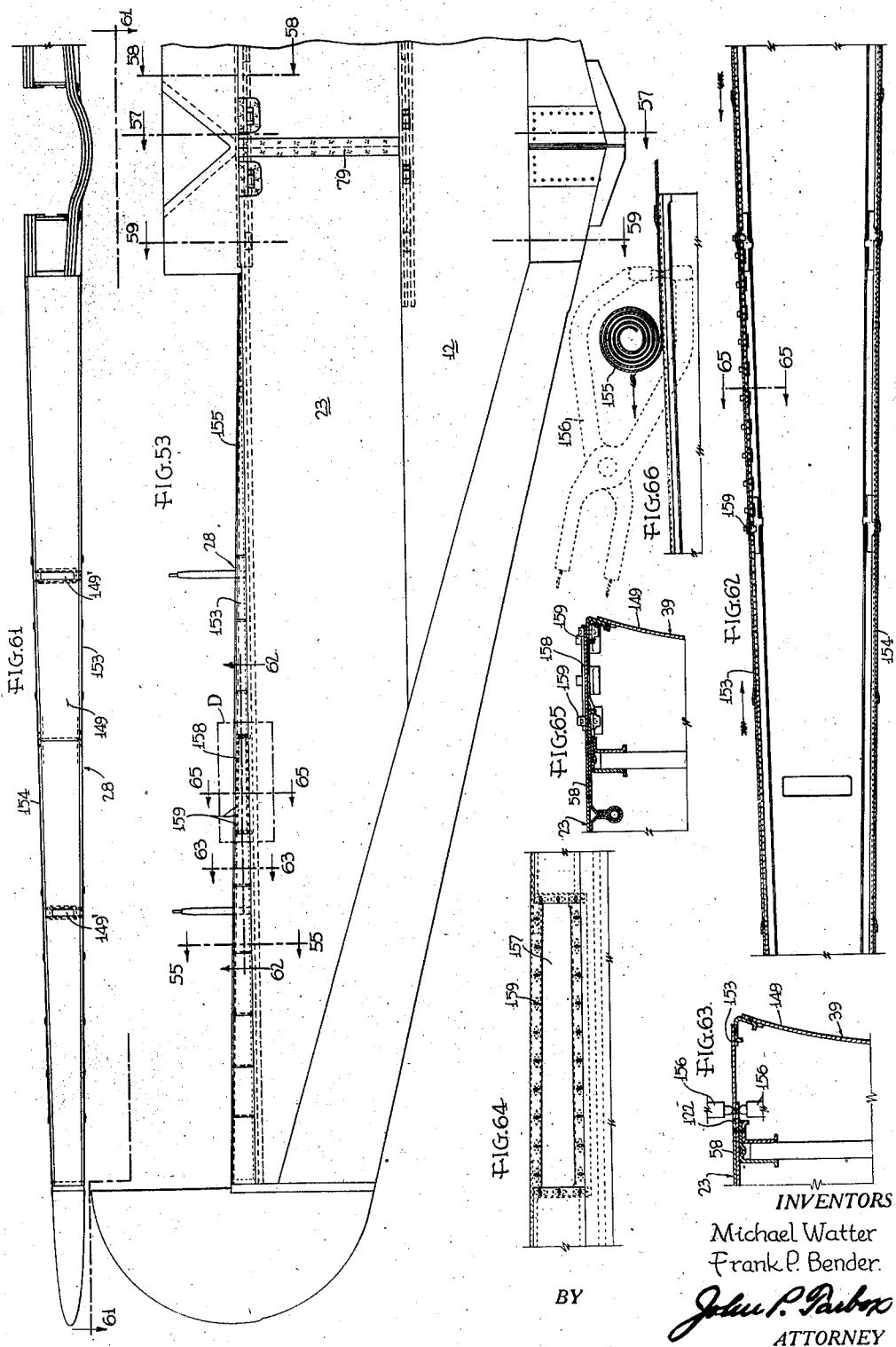

Nov. 4, 1947. M. WATTER ET AL 2,430,438
METHOD OF MANUFACTURING AND ASSEMBLING AIRFOIL STRUCTURES
Filed March 15, 1943 19 Sheets-Sheet 14

INVENTORS.
Michael Watter
Frank P. Bender
BY
ATTORNEY

INVENTORS.
Michael Watter
Frank P. Bender.
BY
ATTORNEY

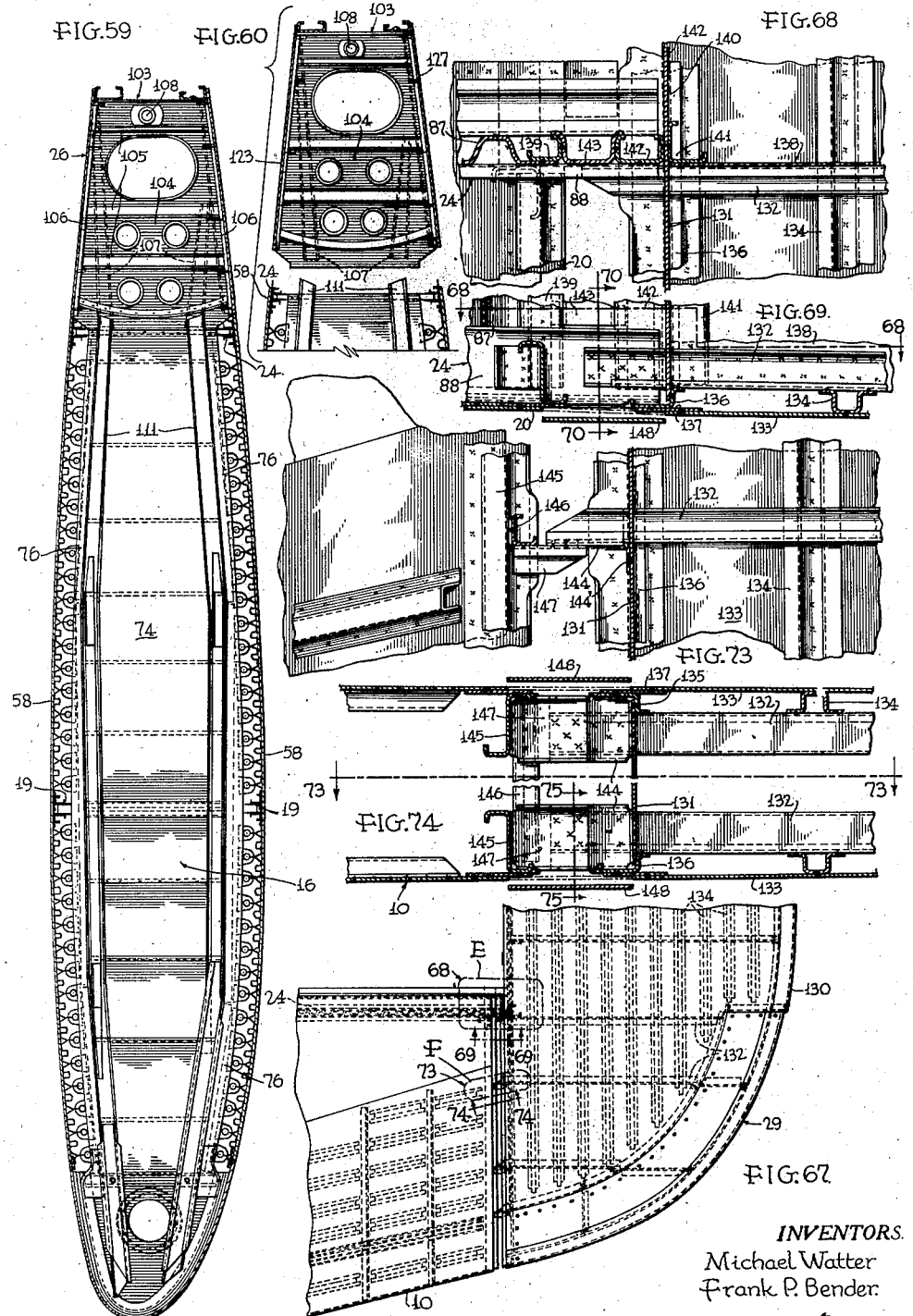

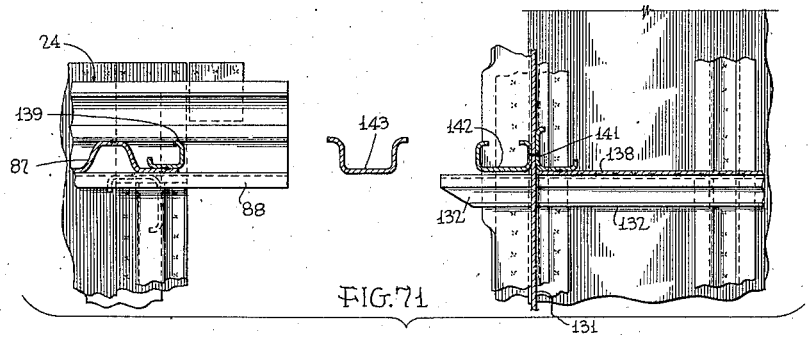
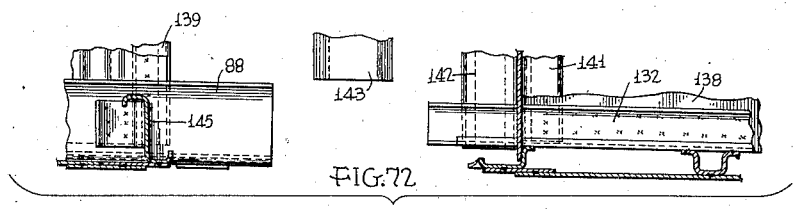
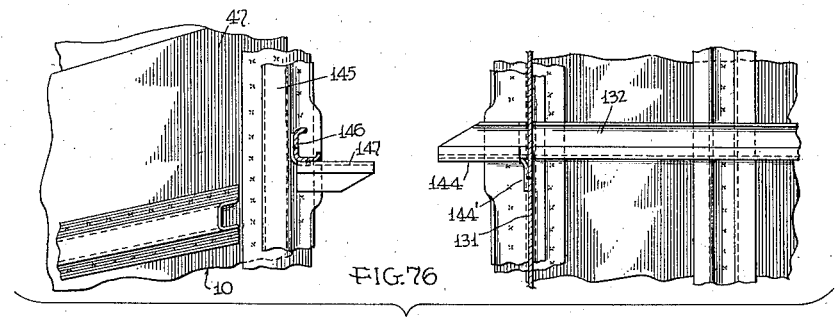
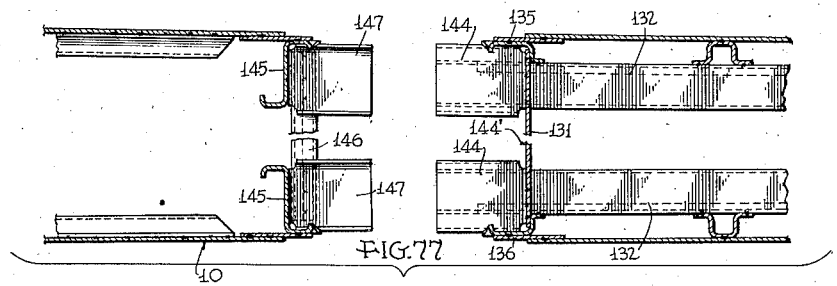
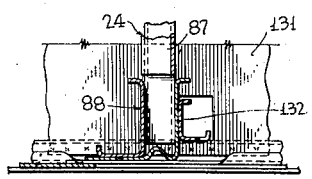
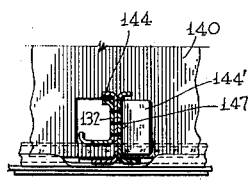
INVENTORS
Michael Watter,
Frank P. Bender.
BY
ATTORNEY

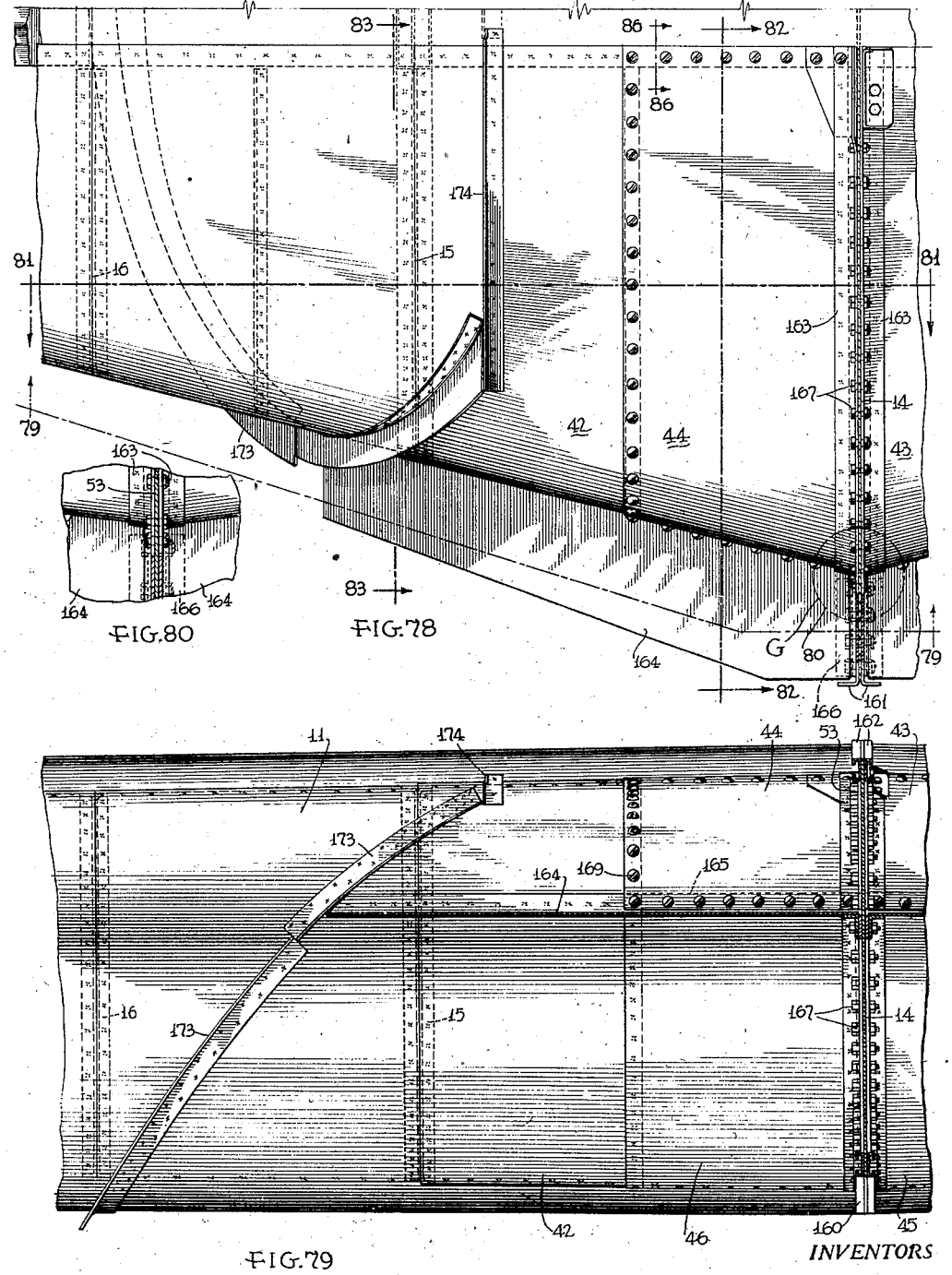

Nov. 4, 1947.  M. WATTER ET AL  2,430,438
METHOD OF MANUFACTURING AND ASSEMBLING AIRFOIL STRUCTURES
Filed March 15, 1943    19 Sheets-Sheet 19
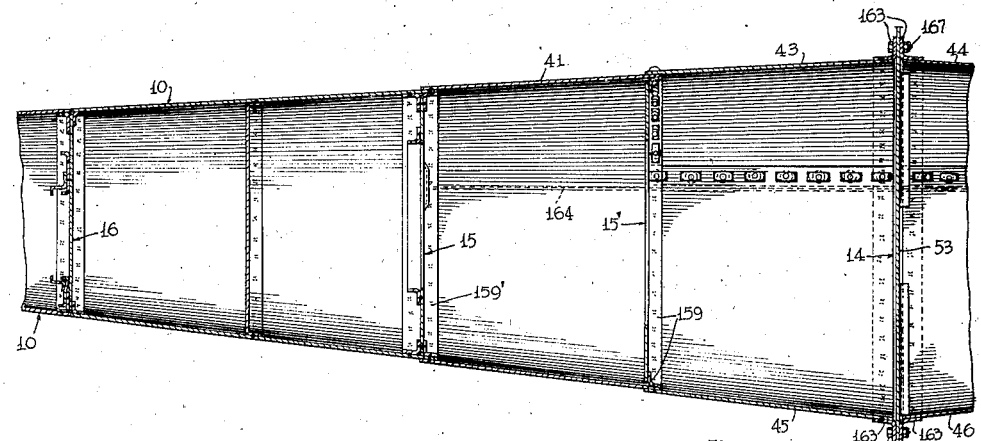
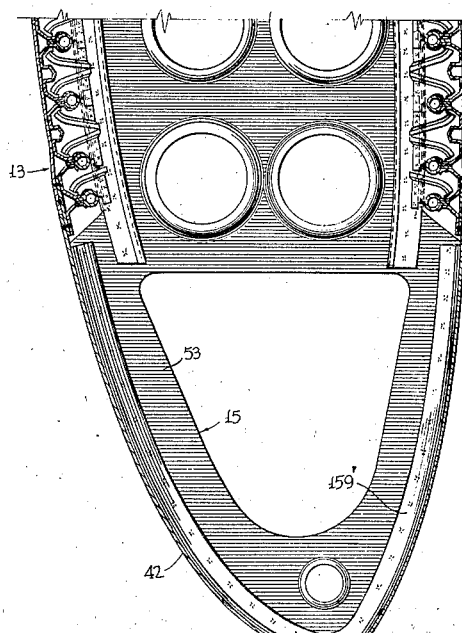
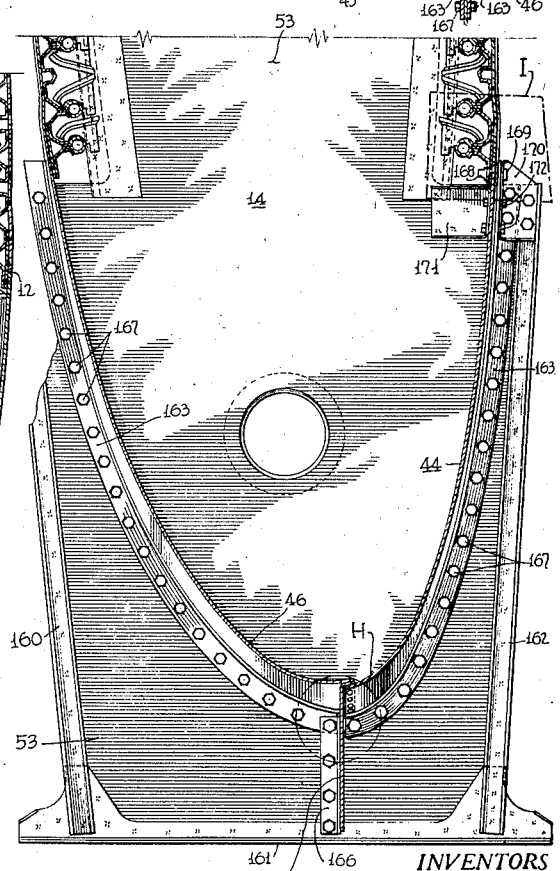
INVENTORS
Michael Watter
Frank P. Bender.
BY
John P. Barbey
ATTORNEY Patented Nov. 4, 1947

2,430,438

UNITED STATES PATENT OFFICE 2,430,438

METHOD OF MANUFACTURING AND ASSEMBLING AIRFOIL STRUCTURES

Michael Watter and Frank P. Bender, Philadelphia, Pa., assignors to The Budd Company, Philadelphia, Pa., a corporation of Pennsylvania Application March 15, 1943, Serial No. 479,188

8 Claims. (Cl. 29—148.2)

1

This invention relates to improvements in airplane structures and the method of assembly of the same, and more particularly to airfoil sustentation structures of the metal stressed skin type.

Such structures are usually designed to transmit the forces, such as the forces exerted by the air pressure thereon, to the body by a structural system including one or more span-wise extending spars and contour forming ribs transverse to the spars and secured thereto, together with a stressed exteriorly smooth skin sheet covering the spars and ribs and secured thereto.

Such structures have heretofore usually been built around the spars, the spars being suitably set up in a jig and the rest of the structure built thereon while so set up. This prolonged the assembly operation because the number of workmen which could be effectually employed in the restricted space around the jig was limited. Furthermore, if the framework and spars are first assembled in the usual manner and the skin sheet then applied, difficulty is experienced, because of the relatively shallow section and great chordwise depth of the structure, in obtaining ready access for the attachment of the skin sheet, particularly since it is desirable to have all parts of the exterior surface exposed to the airflow, smooth and free from projections which would lower the aerodynamic efficiency of the structure as a whole.

It is an object of the invention to facilitate the manufacture of such structures by constructing them of a plurality of convenient subassembly structures, which can each be separately assembled on a suitable jig where ready access can be had to secure the parts of the subassemblies together, and to provide such subassemblies with freely accessible final assembly joint structures permitting their ready joinder to each other in the final assembly with a relatively small number of joining operations. To some extent, the order in which the subassemblies are brought together and joined in the final assembly further accelerates the final assembly operation.

Another object is the provision of a very strong structure as compared with its weight and one which has a longer life than the usual such structure.

To achieve this object, the parts entering into the structure are preferably made of sheet metal having a high strength-weight ratio and high resistance against fatigue, such as high-tensile stainless steel, and the parts are further designed of such section as to impart great strength when

2 joined together. Also the parts entering into the subassemblies and the final assembly joint structures are so constructed and arranged as to permit their easy assembly by simple spot welding operations. The joints are so arranged that substantially the full strength of the material is developed. Spot welding of the parts to make the joints is preferred, because it eliminates the necessity of providing rivet holes, which tend to weaken the structure, and further avoids the necessity of providing counter-sinks for the rivet heads if these are in a position where they would interfere with the smooth air flow over the outer surface of the structure.

Figure 15:
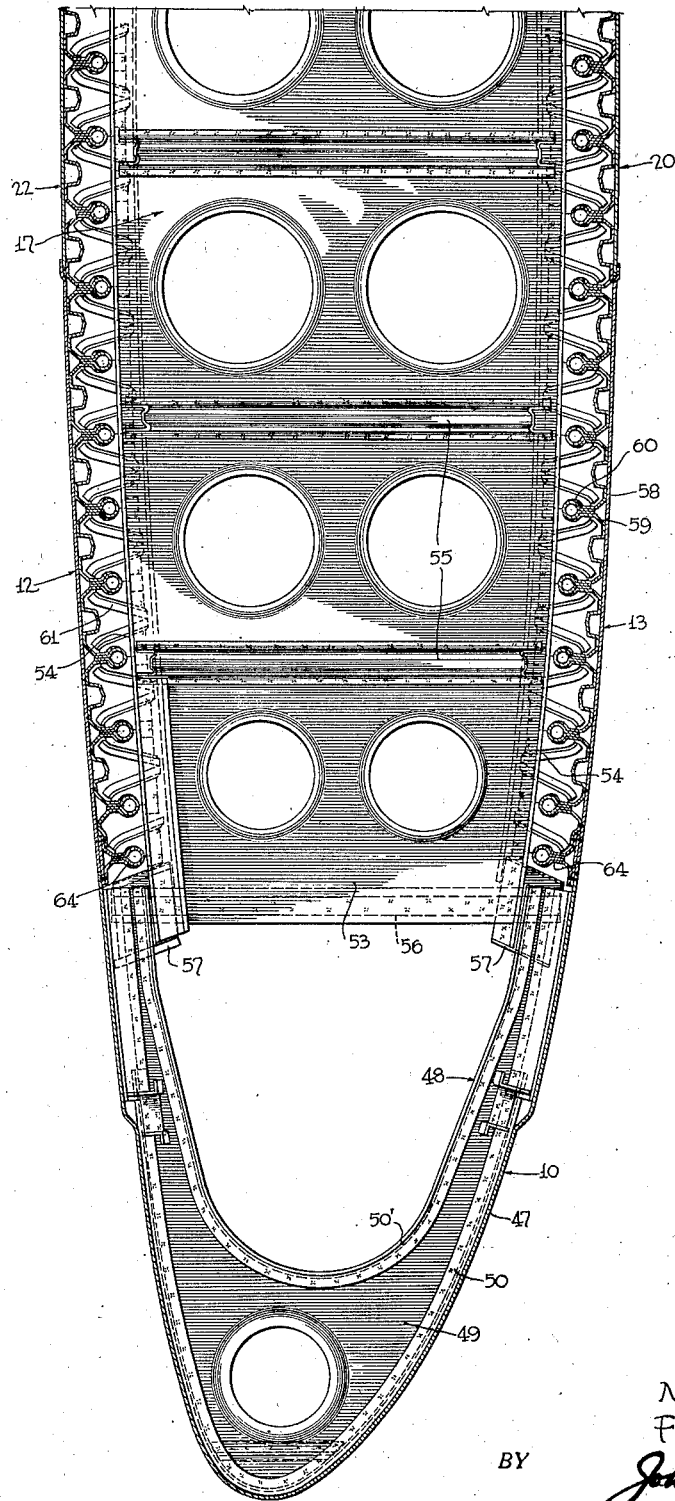
Figure 16:
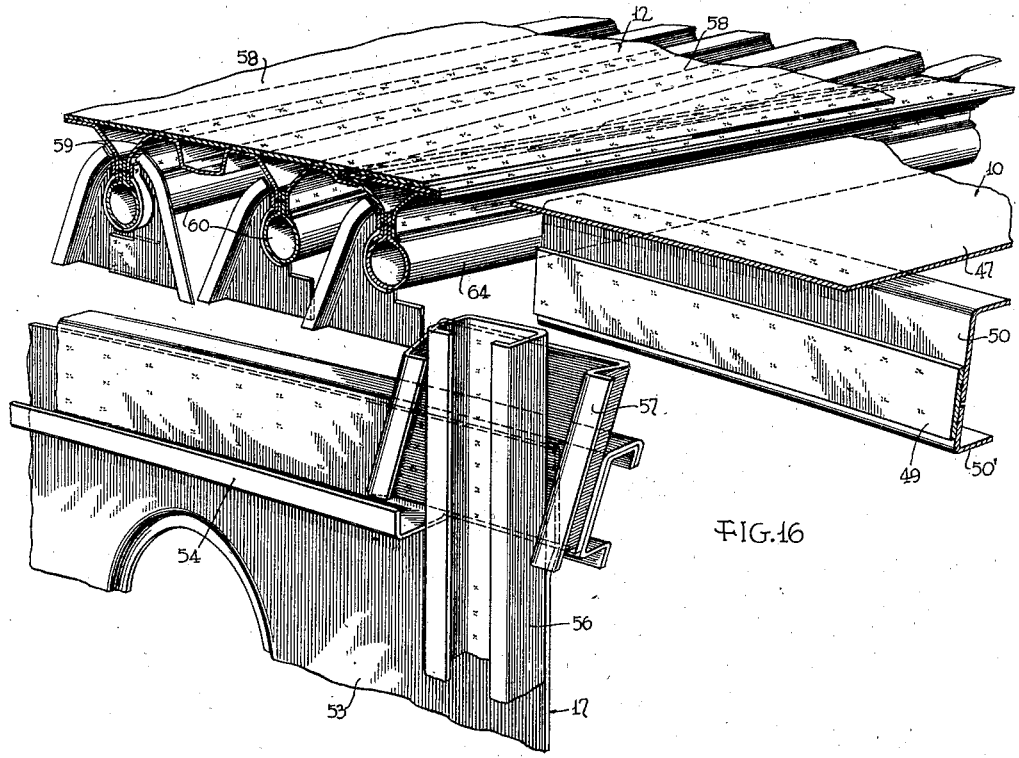
Figure 17:
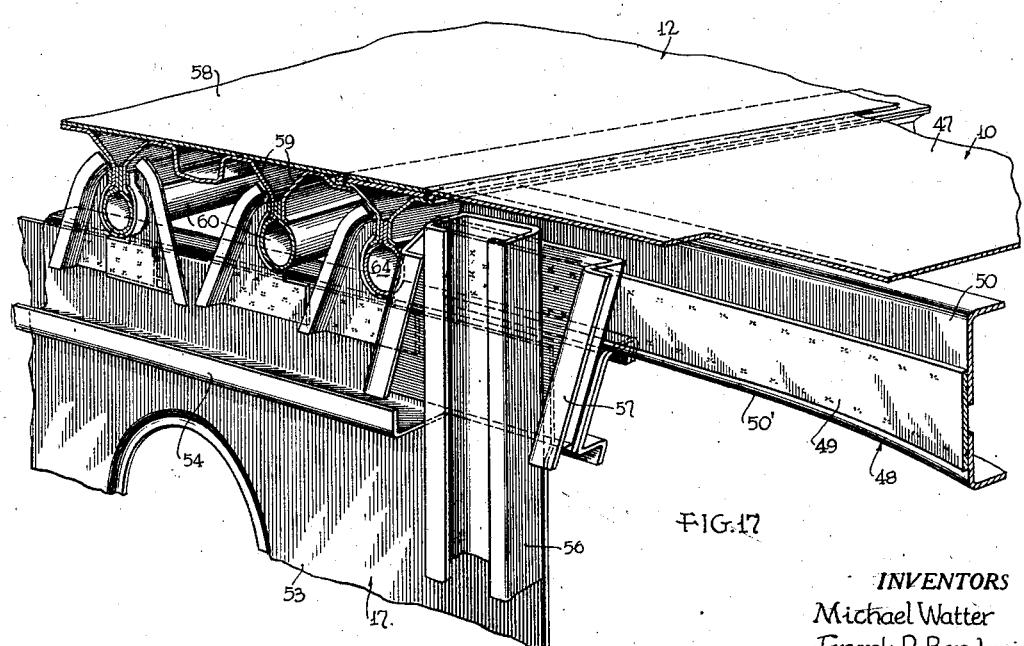

It is to be understood, however, that many of the features of the novel structure and method of assembly of the invention are not limited to the particular means used for joining the parts together. Other and further objects and the manner in which they are attained will become clear from the following detailed description when read in connection with the accompanying drawings forming a part of this specification:

In the drawings:

Fig. 1 is an exploded view of the airfoil structure, namely, a horizontal stabilizer, to which the invention has been shown applied, showing separately the various parts and subassemblies, which when assembled as shown in the succeeding views, Figs. 2 to 13, will result in the completed structure, Figs. 2 to 13, inclusive, are a series of views showing the various successive steps which may conveniently be employed in the assembly of the airfoil structure, Fig. 14 is an exploded view in cross section taken chordwise of the airfoil in a lateral region thereof, the view being on an enlarged scale showing in detail, the top and bottom skin blankets, a typical rib and the nose or leading edge portion of the airfoil each in their preassembled form, Fig. 15 is a view similar to Fig. 14, but with the parts in their finally assembled relation, Fig. 16 is an exploded enlarged fragmentary perspective view showing in detail the final assembly joint parts of the preassembled units of Fig. 14, Fig. 17 is a view similar to Fig. 16, but with the units in their finally assembled relation, Fig. 18 is an exploded perspective view of a form of a two-part clip used for the connection of the skin blankets to the ribs, Fig. 19 is a fragmentary spanwise sectional view through the central portion of the upper front skin blanket assembly before it has been bent to take the dihedral form of the completed structure, Fig. 20 is a view similar to Fig. 19, but with the blanket shown bent, reinforced in the bend and secured to the central rib, Fig. 21 is a fragmentary cross sectional view, the section being taken substantially on the line 21—21 of Fig. 20, Fig. 22 is a fragmentary spanwise sectional view through the central abutting portions of the upper rear skin blankets showing them in their angular relation to conform to the dihedral of the structure, Fig. 23 is a view similar to Fig. 22, but with right and left skin blanket sections shown joined together and to the central rib, Fig. 24 is a fragmentary cross sectional view, the section being taken substantially on the line 24—24 of Fig. 23, Fig. 25 is a fragmentary plan view, looking at the inside of a front skin blanket, showing the corner construction of the forward margin thereof, Fig. 26 is a fragmentary cross sectional view, the section being taken substantially on the line 26—26 of Fig. 25, Fig. 27 is an enlarged spanwise fragmentary vertical sectional view taken in the central region of the airfoil structure just forward of the front or intermediate spar, the section being taken substantially on the line 27—27 of Fig. 10, Fig. 28 is a chordwise fragmentary vertical sectional view through the lower portion of the structure on a further enlarged scale, the section being taken substantially on the line 28—28 of Fig. 10, this view showing the manner of assembly of the fore and aft portions of the central rib to each other and to the spar, Fig. 29 is a fragmentary perspective view further illustrating the joint shown in Fig. 28, Fig. 30 is a perspective view similar to Fig. 29 showing the front spar in the region of the joint, previous to the insertion of the central rib, a final assembly joint element being shown alongside the spar proper, Fig. 31 is a fragmentary perspective view of the lower portion of the fore and aft central rib sections prior to their joinder to each other, Fig. 32 is a fragmentary cross sectional plan through the righthand portion of the front spar, as seen in Fig. 27, showing the rib attachments to it, the section being broken and taken substantially on the line 32—32 of Fig. 27, Fig. 33 is a fragmentary enlarged view of the lefthand end of the front spar showing its manner of assembly to a strong shear rib, the latter being indicated in cross section, the parts shown being indicated in Fig. 27 by the dot and dash rectangle A, Fig. 34 is a fragmentary perspective view further illustrating the joinder of the shear rib to the front spar, Fig. 35 is an enlarged detail sectional view showing the connection of an attachment fitting to the front spar, the section being taken substantially on the line 35—35 of Fig. 33, Fig. 36 is an enlarged cross sectional view taken through the assembled structure, the section being taken substantially on the line 36—36 of Fig. 12, and showing a rib next adjacent the central rib in elevation, Fig. 37 is a fragmentary enlarged vertical sectional view of the joint between the rib shown in Fig. 36 and the front spar, the section being taken on the opposite side of the rib from that of Fig. 36 and looking toward the rib; the rear rib section being shown in full lines in final assembly and in dot and dash lines in preassembly.

Figure 55:
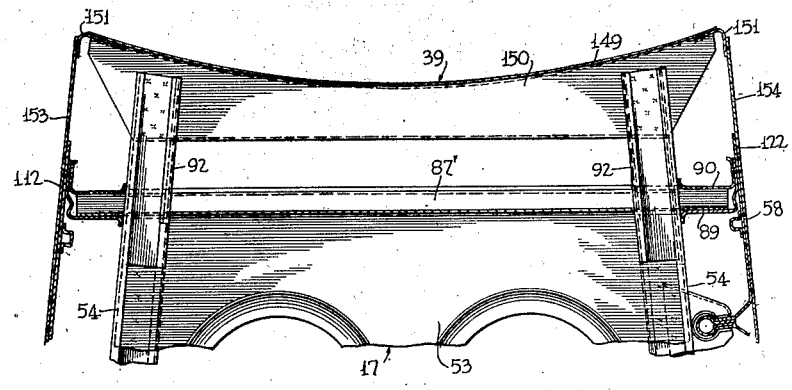
Figure 56:
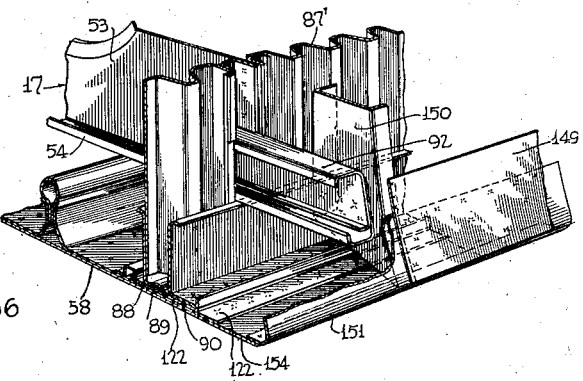
Figure 54:
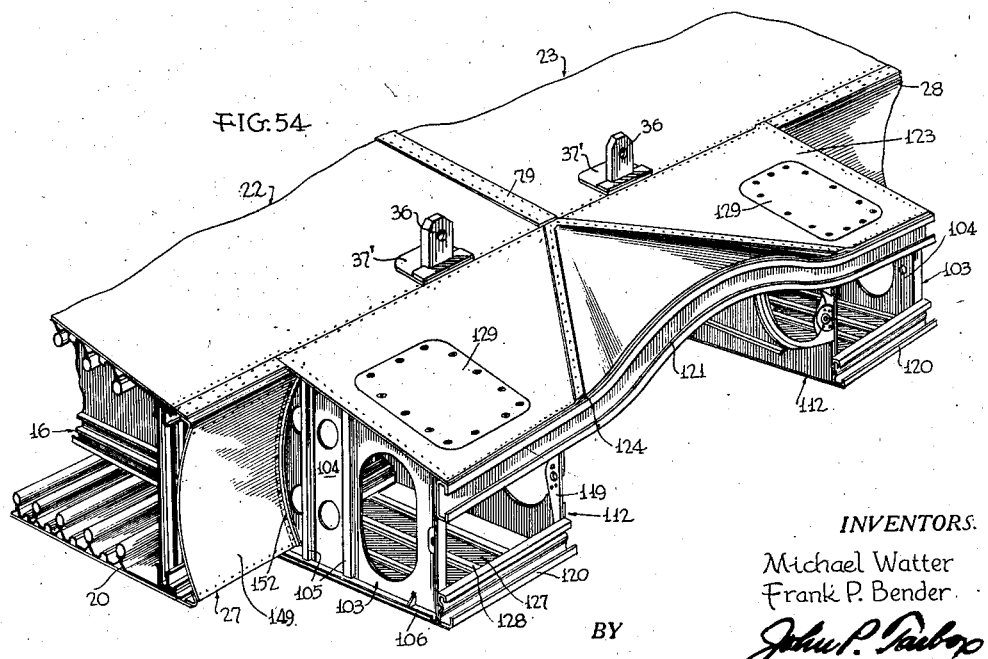
Figure 57:
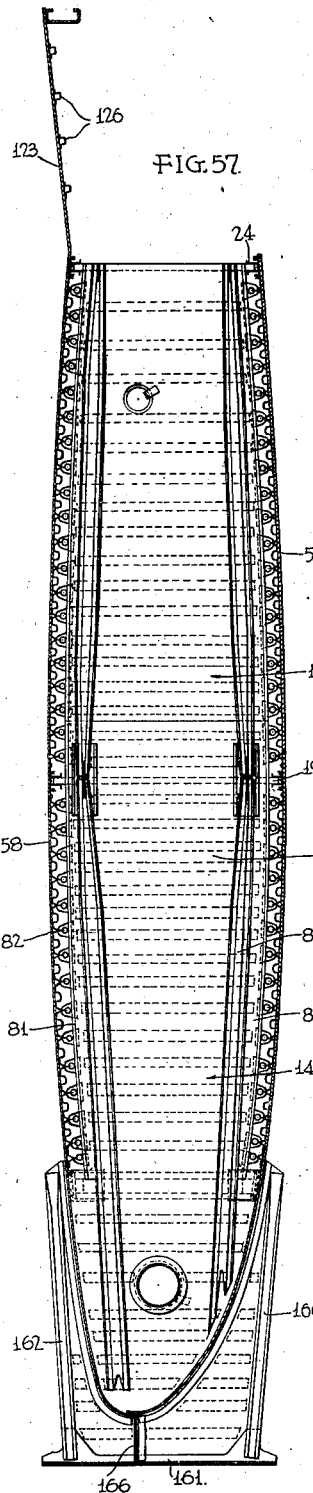
Figure 58:
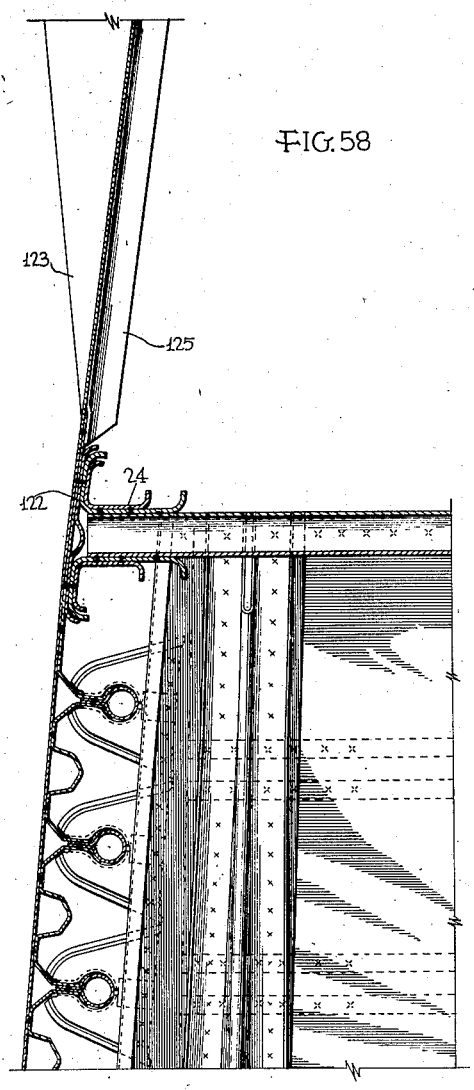

Fig. 38 is a fragmentary detail sectional plan view through the joint, the section being taken substantially on the line 38—38 of Fig. 37, Fig. 39 is an enlarged view similar to Fig. 27 showing the parts enclosed by the dot and dash rectangle B of that figure in greater detail, Fig. 40 is a fragmentary cross sectional plan through a portion of the rear or main spar, the section being broken and corresponding in location spanwise of the structure to the view of the front spar shown in Fig. 32, Fig. 41 is a chordwise fragmentary vertical sectional view through the structure in the rear spar region, the section being taken substantially on the line 41—41 of Fig. 40, showing a portion of the central aft structure subassembly including the hinge bracket extension of the rib in spaced relation, Fig. 42 is a fragmentary detail cross sectional view, the section being taken substantially on the line 42—42 of Fig. 36, Fig. 43 is a fragmentary perspective view further illustrating the connection between the hinge bracket extension and rib with the parts in separated relation similar to that shown in Fig. 41, Fig. 44 is an enlarged chordwise cross sectional view through the airfoil structure, the section being taken substantially on the line 44—44 of Fig. 10 and showing a hinge rib in elevation, Fig. 45 is a detached elevational view of the forked hinge bracket shown assembled in Fig. 44, Fig. 46 is a fragmentary enlarged detail view of the bracket and joint in the region inclosed by the dot and dash inclosure C of Fig. 44, Fig. 47 is a view, on the same scale as Fig. 46, of the bracket and joint, as seen substantially along the line 47—47 of Fig. 44, Fig. 48 is an enlarged detail sectional view, taken substantially along the line 48—48 of Fig. 46, Figs. 49, 50 and 51 are enlarged detail sectional views taken respectively on the lines 49—49, 50—50 and 51—51 of Fig. 44, Fig. 52 is an enlarged detail sectional view taken substantially on the line 52—52 of Fig. 46, Fig. 53 is an enlarged plan view of the finished airfoil structure, the righthand portion being broken away, Fig. 54 is a fragmentary perspective view showing the rear central portion of the completed structure, Fig. 55 is a fragmentary detail sectional view showing the joint between the rear spar and a typical rib and the manner of connection of the arch, the section being taken substantially on the line 55—55 of Fig. 53, Fig. 56 is a fragmentary perspective view with parts broken away showing more clearly the construction of Fig. 55, Fig. 57 is an enlarged chordwise sectional view through the airfoil structure, the section being taken substantially on the line 57—57 of Fig. 53 and showing the central rib in elevation, Fig. 58 is a similar fragmentary section on an enlarged scale of the rear upper portion of the structure, the section being taken substantially on the line 58—58 of Fig. 53, Fig. 59 is a view similar to Fig. 57 but taken in the region indicated by the section line 59—59 of Fig. 53, and showing the adjacent shear rib and its attached hinge bracket extension in elevation, Fig. 60 is a view similar to Fig. 59 showing the rear portion of the structure, but with the hinge bracket extension on the central aft structure subassembly spaced from the rib proper, Fig. 61 is a rear elevational view of the structure of Fig. 53 as seen when looking forwardly along the line 61—61 of said Fig. 53, Fig. 62 is a fragmentary enlarged spanwise sectional view taken rearwardly of the main or rear spar, the view being taken substantially on the line 62—62 of Fig. 53.

Fig. 63 is a detail sectional view taken substantially along the line 63—63 of Fig. 53 showing the manner of attachment of the skin sheet extending between the rear spar and the arch proper, Fig. 64 is a fragmentary plan view on an enlarged scale of the part of the structure shown within the dot and dash rectangle D of Fig. 53, the cover for the rectangular opening shown having been removed, Fig. 65 is a detail sectional view on a scale similar to Fig. 63, the section being taken substantially on the line 65—65 of Fig. 53 and showing the cover secured in place, Fig. 66 is a fragmentary detail chordwise sectional view showing a method of securing the longitudinal skin sheet strip extending from the central aft structure outwardly toward the tip and spanning the space between the arch proper and the rear spar, Fig. 67 is a fragmentary plan view, on an enlarged scale, of the outboard portion of the structure, showing the stabilizer tip and its connection to the rear spar and leading edge or nose portion of the main body, Fig. 68 is an enlarged detail horizontal sectional view taken in the region of the dot and dash rectangle E of Fig. 67, the section being taken substantially on the line 68—68 of Fig. 69 between the top and bottom faces of the structure and showing the joint between rear spar and the tip, Fig. 69 is a detail cross sectional view of the same joint but in a vertical plane as indicated by the line 69—69 of Fig. 67, the joint-closing sheet being shown in separated relation, Fig. 70 is a detail sectional view through the same joint, the section being taken substantially on the line 70—70 of Fig. 69, Fig. 71 is an exploded detail sectional view of the joint similar to the section of Fig. 68, Fig. 72 is a view similar to Fig. 71 but corresponding to the section of Fig. 69, Fig. 73 is an enlarged fragmentary detail horizontal sectional view taken in the region of the dot and dash inclosure F of Figure 67 and substantially along the line 73—73 of Fig. 74, and showing a typical joint structure between the nose or leading edge portion and the tip, Fig. 74 is a similar detail cross sectional view of the joint with parts broken away taken substantially along the line 74—74 of Fig. 67, and showing the top and bottom closing strips in spaced relation, Fig. 75 is a detail sectional view of the same joint taken substantially along the line 75—75 of Fig. 74, Fig. 76 is an exploded detail sectional view of this joint corresponding to the section of Fig. 73, and Fig. 77 is a similar view corresponding to the section of Fig. 74, Fig. 78 is a fragmentary enlarged plan view and Fig. 79 a similar front elevational view with parts in section, respectively, of the central leading edge or nose portion of the airfoil structure, the view of Fig. 79 appearing as seen looking in the direction of the arrows at the ends of the section line 79—79 of Fig. 78, Fig. 80 is a detail enlarged view of the portion within the dot and dash circle G of Fig. 78, Fig. 81 is a spanwise vertical cross sectional view taken substantially on the line 81—81 of Fig. 78, Fig. 82 is a chordwise sectional view taken substantially on the line 82—82 of Fig. 78, and Fig. 83 is a similar view taken substantially on the line 83—83 of Fig. 78, Fig. 84 is an enlarged detail view of the parts shown within the dot and dash circle H of Fig. 82, Fig. 85 is an enlarged detail view of the parts shown in the dot and dash enclosure I of Fig. 82, and Fig. 86 is a fragmentary detail cross section taken substantially on the line 86—86 of Fig. 78.

As shown in the drawings, the stabilizer is fabricated in a number of separate parts and subassemblies indicated in diagrammatic fashion in Fig. 1 and designated in that figure by appropriate names. Each of these parts and subassemblies is formed with final assembly joint structures which facilitate their assembly to each other in final assembly. For convenience in the further description, the main subassemblies entering into the structure will be referred to by general reference numerals.

Beginning at the bottom of Fig. 1, the right and left leading edge or nose subassemblies are designated by the numerals 10 and 11, the upper front skin blanket by 12, the lower front skin blanket by 13, the front center rib section by 14, the front sections of the ribs flanking the center rib by 15, the strong shear ribs by 16, the typical ribs by 17, the hinge ribs by 18, and rear sections of the ribs sections 14 and 15, by 14a and 15a, the front or intermediate spar by 19, the lower right and left rear skin blankets by 20 and 21, and the corresponding upper skin blankets by 22 and 23, the rear or main spar by 24, the hinge brackets for securement to the rear end of the hinge ribs by 25, the central aft extension structure by 26, the right and left arch assemblies by 27 and 28, and the right and left stabilizer tips by 29 and 30. Other minor parts which enter into the final assembly will be referred to in the detailed description by suitable reference numerals.

In the assembly of these parts and subassemblies into the final assembly, reference may be had to the showing in Figs. 2 to 13 to show the general order of assembly which has been found convenient and provides access of a number of workmen in the operation, speeding up the final assembly. It will be understood that all the subassemblies may not be completed in their separate benches or jigs at the commencement of the final assembly operation, so that the workmen may be distributed in the shop, some working on subassemblies, while others work on the final assembly.

As shown in Fig. 2, the leading edge or nose portions 10 and 11, each including a skin sheet and spaced nose ribs, are first set up in a suitable final assembly jig, in a rearwardly inclined relation with their adjacent ends spaced apart by a gap, as 31.

As shown in Fig. 3, a front skin blanket as 12 is then brought into place and welded through its inclined front margins to the inclined rear margins of the adjacent sides of the nose portions 10 and 11.

As shown in Fig. 4, certain of the ribs, as the front rib sections 14 and 15 and the shear ribs 16, are then located in place and the skin blanket, as 12, is welded to these ribs. The nose portions may also at this time be welded to the shear ribs 16. Other of the ribs, as five typical ribs 17 and a hinge rib 18, may also be set in place on each side of the center line and secured to the mating ribs of the nose portions 10 and 11.

As shown in Fig. 5, the other of the front skin blankets, as 13, may then be brought into place and welded through its inclined front margins to the adjacent margins of the nose portions 10 and 11 and to the rib sections, 14, 15 and 16.

The next step may be the welding of all the ribs so far assembled with the structure to both the upper and lower front skin blankets, as shown in Fig. 6. Also, the short front or intermediate spar 19 may now be slid forwardly into place between rear margins of the front skin blankets and secured, as by welding and otherwise, to the shear ribs 16 and to the top and bottom front skin blankets 12 and 13. After the spar is in place, the top and bottom attachment fittings, as 32, may be inserted through the openings, as 33, in the skin blankets and rigidly secured to the spar 19.

Proceeding now to Fig. 7, one of the rear skin blankets, such as the combined lower right and left blankets 20 and 21 may now be brought into place and joined, through their front edge portions extending at right angles to the central vertical plane of the structure, to the mating rear margin of the lower front skin blanket 13 and through the inclined portions of their front margins to the mating inclined rear margins of the nose portions 10 and 11. The right and left blankets are also joined together along their abutting margins at 34 in the central plane.

Then the rear rib sections 14a and 15a may be located and secured to the front sections 14 and 15, to the spar 19 and to the lower rear skin blankets 20, 21. The remaining lateral ribs 17 and 18, are also located and secured to the nose portions 10 and 11 in overlapping relation with the nose ribs. At this point also all the ribs not yet secured to the rear skin blankets 20, 21 are welded thereto. As shown in Fig. 8, substantially all the ribs except the center rib 14, 14a have parts projecting rearwardly a slight distance beyond the rear margin of the skin blanket for a purpose which will become clear as the description proceeds.

The next step, see Fig. 9, may be the application of the upper rear skin blankets 22 and 23 to the structure and the securing of the same to the front upper blanket 12 and to the rear inclined margins of the nose portions 10 and 11.

The two upper rear blankets 22, 23, see Fig. 9, are also secured to each other in the center line and to the various ribs which they overlap. These connections of the upper rear skin blankets are similar to the connections of the corresponding lower rear blankets 20 and 21.

As shown in Fig. 10, the rear or main spar 24 may now be slipped forwardly into place between the rear margins of the top and bottom rear skin blankets and welded thereto. In this movement the rearwardly projecting extremities of the ribs may pass through slots provided therefor in the main spar assembly, and the spar when in place is also secured to certain of the ribs. The attachment fittings, as 36, which may be a part of the main spar subassembly, as indicated in Fig. 1, enter the slots 37 provided therefor in the rear margins of the rear skin blankets (see Figs. 9 and 10), in the assembly of the main spar 19 to the structure. The hinge brackets 25 may now be secured to the hinge ribs and these ribs secured to the spar and the central rearwardly projecting aft structure subassembly as 26 secured in place, as shown in Figs. 10 and 11. Also, the end tip structures 29 and 30 are secured in place to the ends of the main spar and nose portions.

Finally, to the rearwardly projecting ends of the ribs may be secured the right and left arch subassemblies, as 38 and 39, see Fig. 11, forming parts, respectively, of the complete right and left arch assemblies 27 and 28 which are shown in Fig. 12 in complete assembled relation to the structure. These arch assemblies 27 and 28 in addition to being secured to the rear ends of the ribs are provided at top and bottom with skin blanket portions closing the space between the arches proper and the rear margins of the upper and lower skin blankets 20, 21, 22 and 23. At the front the space between the nose portions 10 and 11 may now be closed by a central nose portion designated generally by 40, Fig. 13, which may for convenience of assembly be made of the six main parts shown in Fig. 1. In the final assembly right and left nose parts 41 and 42 are first secured, respectively, to the adjacent nose portions 10 and 11 in continuation thereof, as shown in Fig. 12. The nose parts 41 and 42 are also secured in their rear margins to the top and bottom front skin blankets 12 and 13. Finally, the remaining opening is closed by the two pairs of nose parts, each pair constituted by a right and left part, the pairs being designated respectively by numerals 43, 44 and 45, 46, see Fig. 1.

The foregoing description gives a general indication of the method of assembly. The particular order of assembly could in some cases be departed from without affecting the speed of assembly and the strong securement of the parts together substantially throughout by spot welding operations.

The following description will give in greater detail the construction of the parts and subassemblies fitting them for the carrying out of the method in an expeditious manner and largely by simple spot welding operations.

Referring now to Figs. 14, 15, 16 and 17 in which the parts and subassemblies are given their general numerical designations, it will be seen that the nose subassembly, as 10, comprises the outer metal skin 47 conforming to a smooth airfoil contour, the skin being supported by spaced ribs or bulkheads, as 48. Each nose rib corresponds in spanwise location to the location of a typical rib 17 or a hinge rib 18 and may comprise a generally U-shaped web 49 provided with a lightening hole having a reinforcing marginal offset and reinforced in its outer and inner margins by angles designated, respectively, 50 and 50'. Figs. 14 and 15 show offsets in the outer angle 50 and in the skin sheet 47, but these are provided merely so that the usual de-icer extending over the nose may be faired into the rest of the airfoil surface. The skin 47 is spot welded to the spanwise extending arm of the angle 50 and at its rear margin extends slightly beyond the rib 48 to form a final assembly joint at top and bottom with adjacent skin blankets. At the hinge ribs, see Fig. 44, the U-section nose rib 48 may be further stiffened by a diagonal brace, as 52. The particular form of the nose rib, except as it enters into the final assembly joint structures, is not material.

The typical rib 17 aft of the nose may comprise a web plate 53 interconnecting top and bottom chords or cap strips conforming generally to the airfoil contour, these chords being of generally Z-cross section and designated by numeral 54. The web plate 53 is spot welded to the vertical web of the Z and the arms of the Z extend spanwise and may be provided with narrow stiffening flanges, as shown. The web may be formed with lightening holes reinforced by marginal offsets and may be stiffened by vertical stiffeners of flanged channel section, as 55, spot welded through their flanges to the web 53 and at their ends to the chords 54.

At the extreme front the web 53 is reinforced by a channel section vertical stiffener 56 extending beyond the chords at top and bottom, this extension being made possible by cutting away the front portion of the adjacent lateral arm of the Z-section chords 54. To further stiffen and strengthen the final assembly joint formation in this region a short channel section reinforcing or gusset member 57 is first inserted between the web 53 and the channel section marginal stiffener 56 and welded to each. The channel gusset 57 also projects vertically beyond the rib chords 54 to form a final assembly joint structure.

In the final assembly of the rib, as 17, to the corresponding nose rib, as 48, the rear margin of the nose rib 48 overlaps the channel gusset 57 and channel 56 on the rib 17 and is welded thereto in the overlap. The same type of final assembly joint occurs at the bottom as at the top of the airfoil, and from the foregoing description, it will be seen that a strong joint readily accessible for welding is provided. It is readily accessible, since at this stage of the assembly, the front skin blankets 12 and 13 are not both in place.

As shown in Figs. 1, 14 and 15, the top and bottom front skin blankets 12 and 13 are the same in marginal configuration and in structure, except that they have their reinforcements on opposite sides so as to fit respectively against the top and bottom of the airfoil ribs and present a smooth exterior surface.

Each skin blanket 12 and 13 is assembled as a separate subassembly and consists of a metal skin sheet 58 reinforced by a spanwise extending inner reinforcing structure. Such structure may comprise a series of channels 59 welded through their bottom walls to the skin sheet 58, which channels are juxtaposed and are additionally stiffened by tubular flanged stringers 60 one telescoped through its flanges between the side walls of adjacent channels and spot welded thereto. To provide for the easy and rapid assembly of the skin blankets with the ribs, suitable metallic clips as 61 are secured in subassembly to each of the tubular stringers, the clips extending chordwise in the location of each rib to which the blanket is to be secured.

In Fig. 18, two of these clips adapted to be secured to a single tubular stringer are shown in their opposed relation prior to assembly. As shown, the clips face each other and are generally symmetrical about a vertical plane between them. Each clip is formed with a flat main body portion 62 adapted to have a wide overlap with the chord of a rib. The clip is formed in its margin away from the margin engaging the stringer with an angular section stiffening flange, and directly opposed to the stringer, it is curved to fit the tubular portion of the stringer and further provided with a stiffening flange in this region. This stiffening flange merges at its outer end into a wide attaching flange 63.

In attaching the clips to the stringers, either one or two opposed clips may be utilized in connection with any particular stringer. For the most part, two opposed clips are used in the structure shown. Where two are used, they are secured through their attaching flanges 63 overlapping the opposite sides of the overlapping channel sides and the flanges of the tubular stringers, as by spot welding. When so secured, the adjacent inner portions of their body portions 62 overlap to some extent but they are not secured together in this overlap until final assembly. This is to allow conforming the skin blanket to the curvature of the airfoil in the final assembly.

As shown in Figs. 1 to 13, the upper and lower front skin blankets are of uniform width through their central portion, in the space between the shear ribs 16, but have their front margins inclined rearwardly from this central region to a point at their outer ends. To provide a convenient and strong final assembly joint structure along this front margin, a marginal stringer 64 bent at the corners is run from end to end along this front margin. As shown in Figs. 16 and 26, this is formed somewhat differently from remaining stringers. It comprises a flanged base portion extending some distance beyond the margin of the skin sheet 58, a distance about equal to the width of the projecting portion of the nose skin 47, and, in the final assembly of either front skin blanket to the nose assembly, the margin of the nose skin 47 overlaps this extension of the stringer 64, comes into abutting relation to the margin of the skin sheet 58 and is secured to the stringer in this overlapping relation, see Figs. 16 and 17. This joint can be readily welded by a spot welding tool introduced from the rear and flanking the opposite sides of the skin blanket being assembled with the nose.

Both top and bottom skin blankets 12 and 13 are assembled to the nose in this fashion and after assembly to the nose, the clips which have their main bodies 62 overlap the webs of the rib chords 54 are strongly secured by welding them to the webs in the overlap. In this operation the portions of main bodies of the clips on opposite sides of a stringer which have a slight overlap with each other are also secured together and to the adjacent rib chord by welding. At the corners, as shown in Figs. 25 and 26, the marginal stringer 64 has its two parts meeting at this point joined to make it in effect continuous. Such joint may be made by introducing a bent rod, as 65, into the tubular ends of the adjacent ends of the stringer and welding it thereto and by applying and welding lap strips as 66 across the joint, Fig. 26, both at the base of the stringer and at opposite sides of the overlapping flanges thereof.

As shown in Fig. 25, the combined channels 59 and tubular reinforcing stringers 60 constituting the main body of the skin blanket reinforcements run spanwise of the structure at right angles to the chord of the airfoil and where they run into the inclined marginal stringer 64, they are cut off on the same incline as the stringer and have their marginal portions extended to overlap and be welded to the inner base flange of the stringer 64.

The stabilizer of the invention has its top and bottom surfaces on opposite sides of the center line arranged at a slight dihedral, because it tapers in thickness from the center toward its ends. To enable the reinforced front skin blankets, as 12, to be readily bent to this dihedral form, all the bulb stringers extending across the blanket are preferably kerfed, as indicated at 67 in Fig. 19. This kerfing facilitates the bending of the blanket 12 to this dihedral conformation, as indicated in Fig. 20, and after the bending, the parts of the stringer on opposite sides of the bend are rigidly united by a flanged tubular bridging member 68 fitting around the tubular portion of the stringer on opposite sides of the kerf and spot welded thereto through the overlapping flanges, as shown in Figs. 20 and 21.

The front skin blankets 12 and 13 are secured to the front portion 14 of the center rib, to the front portions 15, 15 of the flanking ribs and to the shear ribs 16 and hinge ribs 18 in substantially the same manner as above described in connection with a typical rib 17, as appears in Figs. 20, 28, 36, 44, 57 and 59. It is also clear from the showing in Figs. 4 to 6 that the nose portions of the ribs 14, 15 and 16 all extend forwardly to the leading edge and that the shear ribs 16 are connected at their front margins to the inner margin of the skin of the respective nose subassemblies 10 and 11, the other three ribs between the shear ribs 16 having their nose ends projecting into the gap 31 between the inner ends of said nose assemblies; and to them the central nose portion 40 is assembled in the final assembly.

After the assembly has proceeded to the stage indicated in Fig. 6, the front or intermediate spar 19 is brought into place and secured into the structure. It is shown in assembled relation in Fig. 27 and is comprised of a composite web 69 consisting in the main of a flat sheet welded to a vertically corrugated sheet and composite top and bottom chords 70 and 71 conforming to the transverse contour of the stabilizer and welded to the opposite sides of the web margins. The web 69 terminates adjacent the webs of the shear ribs 16, 16 but the chords 70 and 71 have extensions 70' and 71' of reduced height extending over the cap strips of the shear ribs and some distance therebeyond. At the location of the center rib 14 and the adjacent flanking ribs 15 the web 69 is slotted to permit passage of these ribs, and in these slotted regions the chords 70 and 71 are of reduced section similar to the section of the reduced extensions 70', 71' of the chords. As shown in Fig. 28, the stringer reinforcing structure of the front skin blankets 12 and 13 is omitted in the location of the front spar 19, and replaced in this region by a flat web having spaced shallow corrugations. With this construction, the skin blankets can be readily bent in this region for assembly purposes.

With the front spar so constituted it can be moved forwardly by bending outwardly the rear margins of the front skin blankets 12 and 13 with its reduced chord extensions sliding over the cap strips of the shear ribs 16 until it is brought to the position of securement, clearly shown in Fig. 28, forward of the rear margins of the front upper and lower skin blankets 12 and 13. In this position it is secured by final assembly joint structures in a manner now to be described.

At its ends it is secured by a T-section final assembly joint formation 72, see Figs. 32, 33 and 34, secured to its web and having its head overlap the head of a similar formation 73 projecting from the web 74 of the adjacent shear rib 16, these abutting T-head portions forming laterally projecting overlapping flanges arranged symmetrically on opposite sides of the web 69 of the spar and secured together in final assembly by spot welding and additionally by bolts as indicated at 75, if desired, to insure the joint carrying heavy tension, as well as shear loads. The overlapping flanges of the spar chord extensions 70', 71' and the cap strips, as 76 of the adjacent shear rib 16, are also secured together as by welding. The rear ends of the forward sections of ribs 14 and 15 project through the slots provided in the spar in their locations but are not secured thereto until their rear extensions 14a and 15a are assembled. The front skin blankets are directly welded through the reinforcing web replacing a hollow stringer in this region to the flanges of the chords 70 and 71 of the spar as shown in Figs. 27 and 28. After the spar is secured in place, as described, the top and bottom attachment fittings 32 are inserted through the respective holes 33 in the front skin blankets into pockets provided therefor in the spar where they are secured as by bolts 77, see Figs. 33 and 35. As shown in Fig. 35, the skin blanket may be additionaly reinforced around the opening 33 by outer reinforcing sheets 33'.

It will be seen that free access is had to facilitate the making of all the necessary joints both in front and in rear of the spar 19 since the space between the skin blankets is open front and back, in the front through the gap 31 between the nose subassemblies 10 and 11.

The joint between the rear skin blankets and the nose portions 10 and 11 is entirely similar to the joint between the front skin blankets and the nose portions and the rear skin blankets are also joined to the ribs in a manner similar to the joinder of the front blankets. As shown in Figs. 14, 15 and 28, the rear skin blanket, by having the side wall of a marginal reinforcing channel 59 thereon overlap the side wall of an adjacent channel 59 of the front blanket and the intervened tubular stringer 60, is secured thereto in the overlap. The rear margin of the skin sheet 58 of the forward blanket overlaps the front margin of the skin sheet of the rear blanket and the adjacent bottom of marginal channel 59 and is secured in the overlap by spot welding.

The right and left rear skin blankets, as 22 and 23, abut each other at an angle at their central portion along the line indicated at 34, Fig. 7, and as appears in detail in Figs. 22 and 23, to make the outer surface conform to the slight dihedral of the structure. In the abutting region the right and left blankets are strongly secured together by overlapping inner strips, as 78, conforming generally to the cross sections of the channels 59 and a part of the tubular portions of the stringers 60 and welded to these members which are aligned on both blanket sections. On the outer face, the skin sheets as 58 are joined by a splice plate strip as 79 spot welded to the skin sheet of each the right- and left-hand blankets.

After the rear skin blankets on at least one face of the airfoil have been secured in place, the rear rib sections 14a, 15a, 15a may be assembled with their front sections 14, 15, 15 to form therewith continuous ribs extending through the front spar 19 and secured to said spar.

Referring now to Figs. 28 to 32, it will be seen that the reinforced web 80, cap strips 81 and hat-section chords 82, of the center rib front section 14, the hat-section being partly cut away adjacent chord ends and stiffened in this region by a bar 82', project through a slot in the web 69 of the spar 19 to provide final assembly joint structures on the rear side of the spar web. The corresponding web, cap strip and chord of the rear section 14a are adapted to overlap these final assembly joint parts on the front sections, as clearly appears by comparison of Figs. 31 and 28, and be secured thereto by welding in the final assembly. After the sections of the rib 14, 14a have been so strongly joined together the slot in the spar is closed by a channel as 83 facing rearwardly and overlapping the rearwardly flanged sides of the slot, with the web 80 of the rib 14 interposed between the channel 83 and one of said flanged sides. This closing channel can then be readily secured to the flanged sides of the slot in the spar web and to the rib web by spot welding from the open rear side of the spar, and when so welded, strongly joins the spar to the rib. The details of this joint are fully disclosed and claimed in a copending application and further description thereof herein is believed unnecessary.

A similar joint is made between the front rib section 15 and its rear section 15a also extending the rib continuously through the spar. As shown in Figs. 36, 37, 38 and 39, the front section of this rib has a web 53 provided with vertical stiffeners 55 similar to the web of the typical ribs 17, this web terminating substantially in the rear face of the web 69 of the front spar 19, see Figs. 32, 36 and 38. Similarly, the rear section 15a, in addition to the vertical stiffeners as 55 which are arranged on the opposite side of the web from the stiffeners of the front section 15, carries deep hat-section rectilinear chord members 84 secured thereto near the top and bottom and extending forwardly beyond the rear margin of the web of said rear section 15a, see Fig. 37. These chords have the end portions of their hat-section, where they pass through the slot in the web 69 of the spar 19, partially cut away with their remaining side walls secured together by a stiffening bar as 84' in a manner similar to the arrangement shown in connection with the center rib, except that in the latter the bar is also used as a connecting member between chord sections.

In the final assembly, the forwardly projecting ends of the chords 84 are spot welded to the reinforced web 53 of the forward section 15, the welds being readily made by reaching in from the front between the spaced nose portions 10 and 11 and between the front skin blankets, see Fig. 8. The slot in the spar web 69 is flanked by rearwardly facing channels as 85, Figs. 32 and 38, and the overlapping webs of the front and rear sections of the rib are spot welded to the side of one of said channels by reaching in from the rear of the spar. Finally, the slot is closed, as shown in Fig. 32, by a channel 86 similar to the channel closing the slot through which the center rib 14, 14a passes, the side walls of which are secured to the spar web in similar manner. Fig. 32 clearly illustrates the final structure after the ribs 16, 15, 15a and 14, 14a have been assembled with the spar.

After the rear skin blankets have been joined to the ribs in a manner similar to the joinder of the front skin blankets to the ribs, the rear spar subassembly 24 extending substantially from end to end of the structure is brought into place between the rear margins of the rear skin blankets, with the rearward extensions of the ribs projecting through slots provided in the spar subassembly. As the spar is moved into place, the attachment fittings as 36, thereon, which are similar to attachment fittings 32 on the front spar and are similarly secured, enter the rearwardly open slots 37 in the skin blankets, which slots may subsequently be closed by suitable cover plates as 37', see Fig. 54. As shown in Figs. 40 and 41, the central portion of this spar is fabricated very similarly to the spar 19, having a composite web 87, comprising in large part a flat sheet welded to a vertically corrugated sheet, interconnecting the marginal top and bottom chords 88, which consist of angular section members secured to the opposite sides of the web 87 along its margins. Outwardly of the center section, to facilitate the attachment of the arch assemblies 28 and 29, the spar chords are of the construction shown in Figs. 55 and 56. Each chord in this outer region consists of two angles 89, 90 each having one arm secured to the opposite sides of the web, which in this region comprises simply a corrugated sheet 87'. The forward angle 89 has a long arm extended rearwardly to overlap the rearwardly extending arm of angle 90 and forming therewith a final assembly joint for the attachment of the rear margin of the skin sheet 58 of the rear skin blankets 20, 21, 22, 23. In the central region, the skin sheets of the blankets are secured to the two flanges of the chords 88 through an intervened reinforcing sheet 122 in the manner similar to that in which the skin sheet is attached to the forward spar.

Referring to Fig. 40, it will be seen that the rear portion 14a of the center rib terminates at the rear face of the rear spar web 87 and is secured to it in a manner similar to its securement to the front spar including a rearwardly facing channel closing the slot in the spar.

The web 53 of the rear rib section 15a, as shown in Figs. 40 and 41. is extended rearwardly through an extension 116 some distance beyond the spar 24, and the chords 84 are cut away and reinforced similarly to the construction where they pass through the slot in the front spar 19 and are extended through a corresponding slot in the spar 24 by channel section extensions 91 thereof, these extensions being welded to the web extension 116 and terminating adjacent the end thereof. The securement of the web of the chord where it passes through the slot in the spar is similar to the securement, as by a rearwardly facing channel, of the rib where it passes through the front spar 19.

The cap strips 76 of the shear rib 16 are also carried through a slot in the web 87 of the spar 24 in overlapping relation to the spar chords 88 and joined thereto in the same manner as they are joined to spar 19. The web 74 of the rib 16 terminates at the rear face of the spar web 87. These webs 74 and 87 are joined together and the slot in the spar web is closed in a manner similar to the securement of the web of rib 15a.

As shown in Fig. 56, the cap strips 54 of the typical ribs are carried rearwardly of the spar 24 through a slot therein and in overlapping relation with and secured to the spar chords 88. It may be pointed out here that the cap strips of all the ribs where they pass through a slot in the spar, either 19 or 24, may overlap and be secured to the chords thereof. In the region of the rear spar 24, the cap strips 54 of the typical ribs have their inner lateral flange cut away, its place being taken by a reinforcing angle 92 welded to the remaining portion of the cap strip and terminating a short distance forwardly of the spar 24, see Fig. 55. The web 53 of the typical rib is joined to the spar by a slot closing channel in a manner similar to the other ribs, see Fig. 56.

The hinge ribs 18, as shown in Figs. 44 to 52, also have their webs, as 93, cap strips, as 94, and chords, as 95, carried a slight distance through the slot therefor in the rear spar. The deep hat-section chords 95 are partly cut away at their ends to permit this, and the side walls of the remaining portion of the hat-section are secured together by an inserted spacing bar 96. The slot in the spar is closed and the web of the rib is secured to the web of the spar in the manner already described in connection with the other ribs.

After the various ribs other than those carrying hinge brackets, and the rear skin blankets have been so secured to the rear spar 24, it is securely tied into the structure and the assembly has progressed to the stage indicated in Fig. 10. In the case of the hinge ribs, as 18, to facilitate proper alignment of the hinge supports for the elevators hinged to the trailing edge of the stabilizer, suitable hinge brackets are first secured to hinge ribs, prior to their securement to the rear spar in the manner described. The form of the bracket and the manner of its securement are clearly shown in Figs. 44 to 52. Such bracket, designated generally by 25 may comprise a forked assembly, consisting of upper and lower struts 25a and 25b, spaced at their forward ends for overlapping engagement with the respective top and bottom chords 95, cap strips 94 and web 93 of the hinge rib, and converging at their rear ends for securement together and to the hinge fitting 98.

As clearly shown in Fig. 50, each strut, as 25b, of the bracket 25 is comprised of two flanged channels 99 secured together through their bottom walls. At their inner ends, as shown in Figs. 45, 46 and 52, the channels have one of their side walls cut away and in this region are spaced apart to receive between them the web 93 and the adjacent cap strip 94 of the hinge rib. The adjacent end of the rib chord 95 overlaps the outer face of one of the bottom walls of one of the channels 99 and all the overlapping parts are strongly secured as by spot welding in the overlap, see Figs. 46, 47, 48 and 52. At their joined ends, as shown in Figs. 45 and 51, the adjacent side walls of the channels are cut away, and the bottom walls of the pair of channels 99 for the two struts which are arranged on the same side of the bracket are cut away to fit together along a line 100. The opposed channels are similarly cut away to fit together along a line 101, these two lines 100 and 101 crossing each other at an angle. Thus in the region of the joinder of the hinge fitting, as 98, the four channels 99 forming the two struts of the bracket, together form but two overlapping thicknesses of metal, see Fig. 51. The hinge fitting 98 overlaps one side of this double thickness and a reinforcing plate 102 overlaps the opposite side, and the four overlapping thicknesses are strongly secured together by spot welding.

This arrangement of joints permits a very light yet strong hinge bracket to be utilized in which all the parts of the bracket and its joinder to the rib are readily effected by simple spot welding operations.

Referring now to Figs. 40 to 43, 54, 59 and 60, it will be seen that both the shear ribs 16 and the adjacent ribs 15, 15a are provided with rearward extensions adapted to serve, like the brackets on hinge ribs 18, as hinge brackets for the elevators, these extensions forming, in final assembly, parts of the central aft extension subassembly 26.

In the case of the shear rib 16, as shown in Figs. 54, 59 and 60, this rearward extension, as 103, may comprise a web 104 reinforced by suitable vertical members as 105, cap strips 106, and chord members 107. The rear end of the web carries a hinge fitting, as 108, in alignment with the other elevator hinge fittings.

In the final assembly, the web 104 of the extension 103 is brought into overlapping relation with the rear margin of the web 74 of the shear rib in the slot provided in the rear spar 24, see Fig. 40, and the webs 74 of the rib 16, extension 103 and spar are then joined together by inserting a rearwardly facing channel, as 110, to close the slot and in spot welding the overlapping parts together in the manner already described in connection with other rib-spar joints. At the same time, the chord members 107 are brought into overlapping relation with the projecting portions 111 of the cap strips 76 of the shear rib and secured thereto in the overlap.

Similarly, the rear rib portions 15a are provided on the central aft extension subassembly 26 with rearward extensions 112 which are in this case of generally box section construction to give them great strength with a minimum of weight. The box section of extension 112 is in the main built up of two sheets 113, 114 flanged in their top and bottom margins and secured together in their flanged margins. The sheet 114 is offset toward the sheet 113 in its inner portion to directly overlap it and to be secured thereto in the region of overlap, and form a double thickness final assembly joint portion in this region. Additionally, the sheets 114, 113 are reinforced at top and bottom by cap strips 115 of angular section and secured to the body of sheet 114 and to the top flanged portion of the sheet 113. In the region of joinder to the top flange of sheet 113, this flange is downwardly offset the thickness of the sheet to make the top surface flush with and in extension of the top flange of sheet 114. At their inner ends the cap strips 115 have final assembly joint extensions opposite the double thickness inner final assembly joint structure formed by sheets 113 and 114.

In the final assembly, the extension 112 is telescoped over the rearward extensions 91 of the chords 84 and the web extension 116 of the rib section 15a from the position shown in Figs. 41 and 43 to the final assembly position shown in Figs. 36 and 42. It will be seen that the channel chord extensions 91 are provided with angles 117 welded to each side wall thereof and in the final assembly the cap strips, as 115, overlap these angles and are spot welded thereto. At the same time, the double thickness web formed by the overlapping front margins of sheets 113 and 114 overlap the bottoms of the channels 91 and the intervened web extension 116 of the rib section 15a and are spot welded thereto. By reference to Figs. 41 to 43, it will be seen that this construction facilitates the final assembly by spot welding, since ready accessibility for the electrodes is provided and when the joint is completed the stiff box section extends through the joint.

At the rear, the extension 112 is shown provided with a large opening and, for stiffness around this opening, the sheets 113 and 114 are offset toward each other and secured together in the offset. At the rear, this offset portion extends to the margin of the extension, and provides a double thickness seat, to which the hinge fitting 118 and the opposed reinforcing plate 119 may be rigidly bolted, as shown in Fig. 43. As shown in Figs. 54 and 36, the plate 119 extends from top to bottom of the web sheet 13, is welded thereto, and is laterally flanged in its rear margin to provide a stiffening and securing flange.

The rearward rib extensions 103 and 112 of the central aft subassembly 26 are secured together transversely along their aft margins. The two adjacent extensions 103 and 112 may be transversely interbraced at their rear lower margins by a flanged channel, as 120. At the top, an arched channel brace, as 121, is extended across the four rib extensions 103, 112 securing two adjacent ones together and also to the opposed pairs, see Fig. 54. The rear portions of the extensions 103 also have a large opening in their web portions, opposite the openings in the extensions 112. These openings provide ready accessibility for attachment of the top and bottom skin blankets and otherwise.

As most clearly shown in Figs. 41, 56 and 58, the skin sheets of the top and bottom rear skin blankets, as 20, 21, 22 and 23, are terminated over the rear spar 24, but the reinforcing plate, as 122, of the skin sheet extends a short distance beyond the spar. In the final assembly of the central aft subassembly 26, the skin blanket 123 for the top thereof is applied by abutting its front margin against the rear margin of the skin sheet of the upper rear blankets 22 and 23 in overlapping relation to the extension of the blanket reinforcement 122 and is secured thereto in the overlap. The skin sheet 123 had previously been secured in subassembly, as by welding, to the rib extensions 103, 112 and to the arched channel brace 121. The skin sheet 123 is arched upwardly in its central portion to conform to the arched brace 121, this arched portion of the sheet fading out at the rear spar. For convenience of forming and assembly the arched portion of the sheet 123 and the portions extending laterally therefrom may be formed separately and joined along an inclined lap joint, indicated at 124, Fig. 54. As shown in Fig. 58, it may be reinforced along the joint 124 by an angle reinforce 125. The skin sheet 123 may also be reinforced by transverse stringers 126, see Fig. 57.

Similarly, the lower rear skin blankets 19 and 20 are extended rearwardly over the adjacent rib extensions 103 and 112 by skin blankets, as 127, which are secured in the same manner as the upper sheet 123 but do not extend across between extensions 112, 112, see Fig. 54. These lower blankets 127 may be reinforced by longitudinal or chordwise stringers as 128.

Openings closed by cover plates 129 may be provided in the top skin blanket 123 providing ready access at all times to the hinge fittings and elevator operation mechanism.

It will be seen that the box section structures formed by the rearward rib extensions 103, 112 and the top and bottom reinforced skin sheets 123 and 127 form a very rigid support for the inner ends of the elevator hinges, and the openness of construction of the aft subassembly 26 affords ready access for the securing of it in place by welding, as above indicated.

The stabilizer tips 29 and 30 may next be assembled with the structure. The particular structure of the tip is immaterial except as its structure enters into the final assembly joint between it and the main body of the structure. Suffice it to say that each tip comprises an outer bow 130 connected at its ends to a flat web bulkhead 131, the bow and bulkhead being connected at intervals by top and bottom rib elements 132, the framework so produced supporting the top and bottom skin blankets, each comprising a skin sheet 133 and spaced stringers 134 extending across the rib members and secured thereto. At the bulkhead, the skin sheet is directly secured to the top and bottom chords 135, 136 of the bulkhead 131 through a strip, as 137, welded to the margin of the skin sheet and to the adjacent chord of the bulkhead. Certain of the rib elements 132 extend through openings in the bulkhead, a short distance therebeyond and these extensions form final assembly joint structures for joining the tip to the main body of the structure.

In the region of the main spar 24 the top and bottom rib elements 132 form chords of a web truss, being interconnected by a web plate, as 138. As shown in Figs. 68, 69, 70, 71 and 72, the chords 88 of the main spar 24 are also extended some distance laterally beyond the adjacent skin blankets, as 20, 22 of the main body and beyond the web 87 of the spar. The web 87 terminates in a vertical final assembly joint member 139 of angle form. The web 138 and the top and bottom chords 132 of the rib or spar extension of the tip in transverse alignment with the main spar 24 are interconnected on the inside of the bulkhead web 131 by an angle 141 and on the outside of the bulkhead web 131 by a final assembly joint forming channel 142.

In the final assembly of the tip to the spar, the top and bottom chord extensions 132 overlap the spar chord extensions 88 and are welded thereto. The channel 142, spar chord 88 and tip rib chord 132 are also welded together in their overlapping relation, see Fig. 69. Access can be readily had for this welding operation by reaching in between the spaced apart skins of the main body and tip structures. The joint is now completed by bringing a bridging and securing channel, as 143, in the space between the angle 139 and the channel 142 and welding its side walls, one to each.

Certain of the rib elements of the tip 29 are joined also to the adjacent nose structure, as 10, a typical such joint being shown in Figs. 73, 74, 75, 76 and 77. The upper and lower rib members 132 are each secured on the outer side of the web 131 of the bulkhead to a reinforcing channel 144 and overlapping and welded to the adjacent member 132 and by a lateral flange 144' to the web 131 of the bulkhead. At the location of the joint, the cap strips 145 of the end rib of the nose portion 10 are interconnected by a vertical angle 146, and to this vertical angle and the adjacent cap strips are secured outwardly extending channels 147 aligned in final assembly with the corresponding channels 144 on the tip structures.

In the final assembly, the channels 147 are brought into overlapping engagement with the channels 144 and welded thereto, see Fig. 75. After the internal joints between the tip and main body have been made as described, the space between the skin sheets of the main body and tip are closed by a closing strip or strips, as 148, fitting into the space between the adjacent margins of the respective skin sheets on the tip and main body and secured, as by welding them in place in the dot and dash line position shown in Figs. 69 and 74.

With the central aft extension structure 26 and the tips 29 and 30 assembled to the main body of the structure, the arch assemblies 27 and 28 each extending from the central aft structure to the adjacent tip may be assembled, closing the trailing edge of the stabilizer structure in those regions.

For the assembly of an arch structure at one side in this instance, the left-hand side, reference should be had to Figs. 53 to 56, inclusive, and Figs. 61 to 66, inclusive. First, the arch subassembly 39 which may include, as a unitary subassembly, a rear curved skin sheet or arch proper 149 reinforced at intervals, as at the location of the ribs of the main structure, by vertically extending channels 150 having one of their side walls curved to the curvature of the curved arch sheet 149 and secured thereto through this curved side wall. At top and bottom, the arch skin sheet 149 is secured to marginal angles 151 having one of their arms secured to the sheet 149 and the other projecting forwardly. The arch subassembly preferably includes a forwardly extending lower skin sheet, such as sheet 154, for closing the space between the arch proper and the rear margin of the adjacent bottom skin blanket 21. This sheet 154 is welded in subassembly along its rear margin to the forwardly extending arm of the adjacent angle 151.

The arch subassembly so constituted may be assembled as a unit with the rearwardly projecting portions of the ribs, as the reinforced cap strip extensions 54, 92 of the typical ribs, as shown in Fig. 55, by bringing the arch in place so that the vertical channels overlap the cap strip extensions and are spot welded thereto. At the same time the forward margin of the closing sheet 154 is brought into overlapping engagement with the rearwardly projecting portion of the reinforcement 122, see Fig. 56, and is secured thereto. It will be understood that the arch proper 149 is slotted, as shown in Fig. 61 at 149', to receive the hinge brackets 25 therethrough. Similar joints are made at the same time with other ribs and at the ends, the arch skin sheet 149 may be secured, respectively, to the rearward extension 103 of the adjacent shear rib 16 and to the corresponding tip of the airfoil. Such end joinder may be, as indicated in Fig. 54, through a curved angle 152 joined through its arms, respectively, to the arch skin sheet 149 and to the web 104 of the rearward extension 103. At the tip end a similar joint (not shown) may be utilized.

To complete the joinder of the arch assembly, as 28, the top rear skin blanket, as 22, is carried rearwardly to close the space at the top between the rear spar and the curved skin sheet or arch proper 149 by a top skin sheet 153 similar to closing sheet 154 forming part of the arch subassembly 39, which sheet 153 is likewise applied along its forward margin in abutting engagement with the adjacent main body skin sheet, as 58, in overlapping relation to the rearwardly extending margin of the skin reinforcing sheet 122 and spot welded thereto in the overlap. The rear margin of the top closing sheet 153 is lapped on the forwardly extending arm of the adjacent marginal angle 151 of the arch sheet 149 and spot welded thereto, see Figs. 63 and 65.

To secure ready access to the interior of the structure for spot welding these closing skin sheets 153 and 154 in place, one or both of them may be constructed in the manner shown in Figs. 53 and 61 to 66, inclusive. According to this method, the sheet, for example, the top sheet 153, is assembled in sections of such length that welding tongs used in securing the sections can reach from one end to the other of a section.

As shown in Figs. 53 and 66, the inner section 155 of the skin sheet 153 may be made longer than could normally be straddled by a welding tong, illustrated in dotted lines, at 156. In such case, the metal of this section may be applied in the form of a roll, which is progressively unrolled as the welding of the section in place proceeds. An alternative method is illustrated in the remaining sections, which are of such short lengths as not to require this preliminary rolling up, to bring them within a length capable of being spanned by the welding tool and enable their successive securement to each other and to the arch proper and main body.

The sheet 153 may thus be assembled in sections from one or both ends, until an opening, at 157, is finally left between adjacent sections, which opening is then closed by a cover plate 158, which may be secured in place from the outside by screw threaded fastening devices indicated at 159.

Where both top and bottom skin sheets 153 and 154 are assembled in this way, the parts are highly accessible to secure them together by welding tongs of moderate length of jaws. It is preferable, however, as above described, to preassemble one of the sheets, as the bottom sheet 154, as a part of the arch subassembly and in that case it could readily be assembled as a continuous sheet extending from end to end either as a unitary sheet or a sheet built up in overlapping sections, as shown in Fig. 62, and secured to the edge reinforcement of the adjacent skin sheet of rear blanket 21 in the final assembly by reaching in from the top, and finally closing the structure by assembling the top closing sheet 153 in the manner just described.

The closure of the central nose portion designated generally by numeral 40 in Fig. 13, may be effected in the manner indicated in Figs. 1, 12, 13 and 78 to 86, inclusive. The nose portion 40 as shown in Figs. 81 and 4 to 13 extends from shear rib 16 on one side of the center to shear rib 16 on the other side thereof. As shown in Fig. 81, the skin of the nose portions 10 and 11 overlaps and is secured to the respective shear rib 16. Similarly, the webs of the forward rib sections 15 between the shear ribs 16 and the central rib 14 conform to and are reinforced by marginal angles 159 conforming to the nose contour. On the other hand, the nose portion of the web 53 of the center rib 14, as clearly appears in Figs. 57, 79 and 82, is extended beyond the contour of the nose at top, bottom and in front to provide a web portion beyond the nose contour having straight sides at top and bottom converging somewhat toward each other and joined at the front by a vertical straight side. The web is reinforced in the straight sided margins by rectilinear members 160, 161 and 162 secured to the web and to each other in their meeting margins. This external structure forms a bracket for securement of the nose of the stabilizer to the body structure, thereby supplementing the bottom attachment fittings 32 and 36 on the spars in securing the stabilizer to the body.

For convenience of assembly, the skin of this central nose portion 40 is preferably assembled in sections. First, the right and left nose skin sections 41 and 42 are assembled with the adjacent nose sections 10 and 11, the associated ribs 16 and 15 and the upper and lower front skin blankets 12 and 13. As shown in Fig. 81, the outer lateral margin of section 42 overlaps the nose portion of rib 16 in abutting relation with the margin of the skin sheet of nose portion 10 and is secured thereto in the overlap. The rear margins of the skin section 42 are secured, as shown in Fig. 82, to the front margins of the top and bottom skin blankets 12 and 13, in a manner similar to the attachment of the skin of nose portions 10 and 11 to the front blankets, as hereinbefore described. The inner lateral margin overlaps the marginal angle 159 of an intermediate nose rib 15' located between ribs 15 and 14 and is welded thereto. For convenience of assembly, the skin sections 41 and 42 may each be constructed in two parts, as shown for 42, overlapping and secured together and to the marginal angle reinforcements 159' of the nose of rib 15. The opposite section 41 is similarly secured. Because of the division of the nose skin by the extended web 53 of the central rib 14, the remaining nose portions of the skin are made in right and left sections located on opposite sides of this web and, to permit most of the assembly operations to be effected by spot welding, each right and left section is divided into top and bottom sections.

Each bottom section 45 and 46 is reinforced along its inner margin adjacent the web of the center rib 14 by a curved angle 163 secured thereto through one arm and to the web of the center rib in final assembly. The skin of sections 45 and 46 conforms to the contour of the nose, is secured along its rear margin to the lower front skin blanket 13 in a manner similar to the joinder of the nose portions 10 and 11 to said blanket. Along their outer edges they overlap the nose portion of the adjacent nose rib 15' and the margin of the section 41 or 42, as the case may be, and are secured thereto in the overlap.

A transversely extending stiffener web 164 may now be applied, one on each side of the web 53 of the center rib 14, this web having a flange 165 overlapping the front margin of the adjacent section, as 46, and the nose of adjacent section, as 42, see Figs. 78 and 79, and being spot welded thereto in the overlap. Access may be had for this welding beyond the rib 15 through the large openings provided in the nose webs of the ribs 15 and 15'. At their inner ends, where webs 164 abut the web 53 of the center rib, these webs 164 each have an angle 166 secured thereto through one arm, the other arm overlapping the web of the center rib for securement thereto. Finally, the curved marginal angles 163 flanking the web of the center rib are both bolted thereto by the series of bolts, as 167, and the marginal angles 166, of the transverse reinforcing webs are similarly bolted thereto.

The central nose portion is finally closed by applying the top sections 43 and 44 arranged on opposite sides of the center rib web. These parts, because not accessible from the inside, are secured in place from the outside all around their periphery by bolting. Preferably nuts, as 168, are welded to the inner side of the margins of the openings closed by these parts, except the margin flanking the center rib web, and bolts, as 169, extending through holes in the sections 43 and 44 are then screwed into these nuts to secure the sections in place. The margins flanking the center rib web are secured to it similarly to the securement of sections 46 and 45 to the center web, as by marginal angles 163 and bolts 167.

To secure the marginal center web stiffeners 160, 162 strongly to the nose structure, a gusset, as 170, connects their inner ends to the inner ends of the angles as 163 and an inner reinforcing bracket 171 is welded to the web 53 of the center rib prior to assembly of the adjacent nose section and overlaps the skin of the said nose section in the region of the outer gusset 170, which has a flange overlapping the outer wall of the skin in this region and these parts are strongly joined together not only by certain of the bolts and nuts, as 168, 169, but also by additional bolts, indicated at 172, see Figs. 82 and 85.

At the proper time the skin of the nose portion may be supplied with an inclined fairing attaching angle or angles indicated at 173, Figs. 78 and 79, welded through an arm thereof thereon to the nose skin. This angle or angles conforms to the contour of the margin of the fairing extending between the stabilizer and the body to which the stabilizer is applied. Additional fairing securing angles, as 174, may be applied chordwise of the skin sheet to which the margin of the fairing merging the vertical fin and the top of the stabilizer may be secured.

While the invention has herein been described in connection with a specific structure, it will be understood that changes and modifications in the structure and method of assembly thereof may be made without departing from the main features of the invention as defined in the appended claims.

What is claimed is:

1. The method of assembling an airfoil structure which is comprised, in part at least, of prefabricated right and left leading edge subassemblies each including skin covering and inner reinforcements secured thereto, a prefabricated spar structure, prefabricated rib structures, prefabricated top and bottom skin subassemblies and a central leading edge portion, which method consists in first locating said right and left leading edge subassemblies in their final assembly relation with their adjacent ends spaced some distance apart, then securing at least certain of said rib structures to the reinforcements of said leading edge subassemblies and applying the skin subassemblies to the leading edge subassemblies and securing them thereto, then securing the spar structure to at least certain of said rib structures and to the skin subassemblies, working partly from the front and partly from the rear of the spar, and thereafter closing the space between said right and left leading edge subassemblies by securing said central leading edge portion to the adjacent ends of the right and left subassemblies and to the leading edges of said skin subassemblies.

2. The method of assembling an airfoil structure which is comprised, in part at least, of prefabricated right and left leading edge subassemblies each including a skin covering and internal reinforcements therefor, subassembled rib structures and a pair of upper and lower skin subassemblies each comprising a skin sheet and reinforcing means therefor, said method consisting in locating the leading edge subassemblies in their final assembly relation with their adjacent ends spaced some distance apart, then locating one of the upper and lower skin subassemblies into overlapping relation to the leading edge subassemblies and securing it thereto, placing certain of the rib structures into the space adjacent the said located skin subassembly with their leading edge portions extending forward of the skin subassembly into the open space between said right and left leading edge subassemblies and securing said rib structures to the said secured skin subassembly, then locating the other of said skin subassemblies and securing it to said rib structures and to said leading edge subassemblies.

3. The method of assembling an airfoil structure which is comprised, in part at least, of a prefabricated pair of right and left leading edge subassemblies each including a skin sheet and internal reinforcements therefor, prefabricated rib structures, and a pair of upper and lower skin subassemblies each comprising a skin sheet and reinforcing means therefor, which method consists in locating the right and left leading edge subassemblies in their final assembly relation with their adjacent ends spaced some distance apart, then bringing one of the upper and lower skin subassemblies into overlapping relation with the leading edge subassemblies while the latter are in this final assembly relation and connecting it thereto, and joining a pair of rib structures in the chordwise plane of the adjacent ends of the leading edge subassemblies and other rib structure laterally outwardly thereof to the respective leading edge subassemblies and to the said connected skin subassembly, locating other rib structures between said pair of rib structures and securing them to the upper skin subassembly, and then locating the other of said skin subassemblies and securing it to said rib structures and to said leading edge subassemblies.

4. The method of assembling an airfoil structure which is comprised, in part at least, of right and left leading edge subassemblies each including a skin sheet and internal reinforcing members arranged in spaced relation spanwise thereof, prefabricated rib structures, a prefabricated spar structure, and upper and lower skin subassemblies each including a skin sheet and stiffening means therefor, the method comprising locating said right and left leading edge subassemblies in their final assembly relation with their adjacent ends spaced some distance apart then locating one of said upper and lower skin assemblies in overlapping relation with said leading edge subassemblies and securing it thereto, then locating and securing certain of the rib structures to the skin subassemblies alone and other of the rib structures to both the internal reinforcing members of said leading edge subassemblies and to said one of the upper and lower skin subassemblies, locating and securing the other one of said skin subassemblies, and then locating said spar between the upper and lower skin subassemblies and in overlapping relation with adjacent rib structures and securing said spar to certain of said rib structures and to said skin subassemblies by reaching in between the upper and lower skin subassemblies, at the front, between said spaced leading edge subassemblies, and at the opening between the rear portions of said assemblies.

5. The method of assembling an airfoil structure comprised, in part at least, of a prefabricated main body portion including a main spar disposed along its rear margin, a prefabricated central aft structure including rib extensions and top and bottom covering skin therefor and having final assembly joint parts for securing it to the main body portion, right and left tip structures, each complete with wing covering and internal reinforcement and of a fore and aft width greater than the width of the main body portion, and right and left arch structures having final assembly joints for securing them to the adjacent portions of the aft structure, to rear margin of main body and to the tip structure, the method consisting, in first, assembling of the central aft structure and tip structures to the main body, and then assembling the arch structures between the central aft structure and the respective tip structures.

6. The method of assembling an airfoil structure comprised, in part at least, of a prefabricated main body including a main spar disposed along its rear margin, a prefabricated central aft structure and prefabricated right and left tip structures, each said aft structure and tip structures extending rearwardly beyond the main body in final assembly, and a prefabricated pair of right and left arch subassemblies including a curved arch sheet and a skin sheet extending forwardly thereof along one margin for securement at its forward margin to the main body in final assembly, said method comprising first, the securing of the central aft structure and tip structures to the main body, then assembling the arch subassemblies to the main body in the space between the central aft structure and the respective tip structures and secured at their ends to the associated portions of the aft structure and tip structures and in finally applying a closing skin sheet to each arch subassembly and connecting the other margin of each arch sheet to the main body.

7. The method of assembling an airfoil structure which is comprised, in part at least, of right and left leading edge subassemblies each including skin covering and interior framing ribs extending rearwardly, rib structures for the body of the airfoil, upper and lower front skin blankets each including skin coverings and attached stringers and rib attaching clips, upper and lower rear skin blankets, a short front spar, a long rear spar, wing tips and arch assembly, which method comprises, first placing the leading edge subassemblies with a space between their adjacent inner ends about equal to the length of the short front spar, second placing one of the front blankets and securing it to the leading edge subassemblies, third placing the ribs at least behind and in the open space between the leading edge subassemblies and securing them to the leading edge subassemblies and to placed ribs, fourth placing the other front skin blanket and securing it to the leading edge subassemblies and to said placed ribs, fifth introducing said short spar from the rear and securing it to the placed ribs and front skin blankets working from in front and from behind said short spar, sixth placing and securing the rear blankets and ribs, seventh introducing said rear spar from the rear and securing it from the rear, eighth securing said wing tips to the leading edge subassemblies and parts therebehind with the rear ends of the tips projecting rearwardly behind said parts, and ninth placing and securing said arch subassemblies.

8. The method of assembling an airfoil structure which is comprised, in part at least, of right and left leading edge subassemblies each including skin covering and interior framing ribs extending rearwardly, rib structures for the body of the airfoil, upper and lower front skin blankets each including skin coverings and attached stringers and rib attaching clips, upper and lower rear skin blankets, a short front spar, a long rear spar, wing tips and arch assembly, which method comprises, first placing the leading edge subassemblies with a space between their adjacent inner ends about equal to the length of the short front spar, second placing one of the front blankets and securing it to the leading edge subassemblies, third placing the ribs at least behind and in the open space between the leading edge subassemblies and securing them to the leading edge subassemblies and to placed ribs, fourth placing the other front skin blanket and securing it to the leading edge subassemblies and to said placed ribs, fifth introducing said short spar from the rear and securing it to the placed ribs and front skin blankets working from in front and from behind said short spar, sixth placing and securing the rear blankets and ribs, seventh introducing said rear spar from the rear and securing it from the rear, eighth securing said wing tips to the leading edge subassemblies and parts therebehind with the rear ends of the tips projecting rearwardly behind said parts, and ninth placing and securing said arch subassemblies and thereafter closing the open space between the inner ends of the leading edge subassemblies by attaching sheets to each side leaving a central space open and working through this space, and finally placing cover sheets over the central opening and attaching it from the outside of the assembly.

MICHAEL WATTER.
FRANK P. BENDER.

REFERENCES CITED

The following references are of record in the file of this patent:

UNITED STATES PATENTS

| Number | Name | Date |
|---|---|---|
| 1,397,020 | Smith | Nov. 15, 1921 |
| 1,559,807 | Thaden | Nov. 3, 1925 |
| 1,603,051 | Hall | Oct. 12, 1926 |
| 1,784,501 | Staiger | Dec. 9, 1930 |
| 1,822,270 | Bunch | Sept. 8, 1931 |
| 1,851,211 | Ragsdale | Mar. 29, 1932 |
| 1,868,073 | Ragsdale | July 19, 1932 |
| 1,893,456 | Sykes et al. | Jan. 3, 1933 |
| 1,902,956 | Hughes | Mar. 28, 1933 |
| 1,966,933 | Ragsdale | July 17, 1934 |
| 2,087,626 | Minshall | July 20, 1937 |
| 2,149,809 | Harlan | Mar. 7, 1939 |
| 2,276,004 | Vidal et al. | Mar. 10, 1942 |
| 2,301,636 | Nicol | Nov. 10, 1942 |
| 2,342,025 | Watter | Feb. 15, 1944 |
| 2,364,494 | Upson | Dec. 5, 1944 |